US012295298B2

(12) United States Patent
Larsen

(10) Patent No.: US 12,295,298 B2
(45) Date of Patent: May 13, 2025

(54) DEVICES, SYSTEMS, AND METHODS FOR CLOUD-BASED IRRIGATION CONTROL

(71) Applicant: Smart Rain Systems, LLC, Centerville, UT (US)

(72) Inventor: Rudy Lars Larsen, Bountiful, UT (US)

(73) Assignee: SMART RAIN SYSTEMS, LCC, Centerville, UT (US)

( * ) Notice: Subject to any disclaimer, the term of this patent is extended or adjusted under 35 U.S.C. 154(b) by 0 days.

(21) Appl. No.: 18/072,370

(22) Filed: Nov. 30, 2022

(65) Prior Publication Data

US 2024/0172609 A1    May 30, 2024

(51) Int. Cl.
A01G 25/16    (2006.01)

(52) U.S. Cl.
CPC ......... *A01G 25/167* (2013.01); *A01G 25/165* (2013.01)

(58) Field of Classification Search
CPC ............................ A01G 25/165; A01G 25/167
USPC ........................................................ 700/284
See application file for complete search history.

(56) References Cited

U.S. PATENT DOCUMENTS

| | | | |
|---|---|---|---|
| 5,099,437 A | 3/1992 | Weber | |
| 5,724,243 A | 3/1998 | Westerlage et al. | |
| 5,902,343 A | 5/1999 | Hale et al. | |
| 5,987,377 A | 11/1999 | Westerlage et al. | |
| 6,298,285 B1 | 10/2001 | Addink et al. | |
| 6,453,215 B1 | 9/2002 | Lavoie | |
| 6,526,807 B1 | 3/2003 | Doumit | |
| 6,782,311 B2 | 8/2004 | Barlow | |
| 6,823,239 B2 | 11/2004 | Sieminski | |
| 7,048,204 B1 | 5/2006 | Addink et al. | |
| 7,182,272 B1 | 2/2007 | Marian | |
| 7,203,576 B1 | 4/2007 | Wilson et al. | |
| 7,337,042 B2 | 2/2008 | Marian | |
| 7,430,458 B2 | 9/2008 | Dansereau et al. | |
| 7,561,057 B2 | 7/2009 | Kates | |
| 7,802,207 B2 | 9/2010 | Agboatwalla et al. | |
| 8,396,821 B2 | 3/2013 | Kuhns et al. | |
| 8,417,533 B2 | 4/2013 | Clawson | |
| 8,419,533 B2 | 4/2013 | Gazdic et al. | |

(Continued)

FOREIGN PATENT DOCUMENTS

| | | | | |
|---|---|---|---|---|
| CA | 2495125 C | * | 11/2012 | ............. A01G 25/16 |
| CN | 109349070 A | * | 2/2019 | |
| WO | WO2010099348 | | 9/2010 | |

OTHER PUBLICATIONS

U.S. Appl. No. 61/649,824, filed May 21, 2012, Larsen.

(Continued)

*Primary Examiner* — Ronald D Hartman, Jr.
(74) *Attorney, Agent, or Firm* — RAY QUINNEY & NEBEKER; Thomas L. Lingard

(57) ABSTRACT

A cloud-based irrigation system may receive, at a cloud-based irrigation controller, irrigation information for a first plurality of irrigation zones for a first irrigation controller and a second plurality of irrigation zones for a second irrigation controller. A cloud-based irrigation system may, based on the irrigation information, generate a stack, the stack including a set of irrigation zones, the set of irrigation zones including a first irrigation zone from the first plurality of irrigation zones and a second irrigation zone of the second plurality of irrigation zones, the first irrigation zone and the second irrigation zone actuated simultaneously.

20 Claims, 10 Drawing Sheets

(56) References Cited

U.S. PATENT DOCUMENTS

| | | | |
|---|---|---|---|
| 8,565,927 B1 | 10/2013 | Campbell et al. | |
| 8,650,069 B2 | 2/2014 | Mason et al. | |
| 8,712,592 B2 | 4/2014 | Carlson et al. | |
| 8,751,052 B1 | 6/2014 | Campbell et al. | |
| 8,862,277 B1 | 10/2014 | Campbell et al. | |
| 9,307,706 B2 | 4/2016 | Larsen | |
| 9,939,344 B2 | 4/2018 | Bracken | |
| 10,101,753 B1 | 10/2018 | Levine et al. | |
| 10,194,598 B2 | 2/2019 | Bauman et al. | |
| 10,660,279 B2 | 5/2020 | Larsen | |
| 10,743,483 B1* | 8/2020 | Melrose | G05B 19/042 |
| 11,112,764 B2 | 9/2021 | Hickenlooper | |
| 11,185,024 B2 | 11/2021 | Larsen | |
| 11,510,373 B2 | 11/2022 | Blejer | |
| 11,553,655 B2 | 1/2023 | Larsen | |
| 11,684,030 B2 | 6/2023 | Larsen | |
| 12,029,173 B2* | 7/2024 | Woytowitz | A01G 25/165 |
| 2003/0093159 A1 | 5/2003 | Sieminski | |
| 2003/0130820 A1 | 7/2003 | Lane, III | |
| 2004/0030456 A1 | 2/2004 | Barlow et al. | |
| 2004/0117154 A1 | 6/2004 | Lane et al. | |
| 2004/0117155 A1 | 6/2004 | Lane, III et al. | |
| 2005/0216130 A1 | 9/2005 | Clark et al. | |
| 2006/0007008 A1 | 1/2006 | Kates | |
| 2006/0015269 A1 | 1/2006 | Rigby et al. | |
| 2006/0112625 A1* | 6/2006 | McNeff | A01C 23/042 47/48.5 |
| 2006/0116793 A1* | 6/2006 | Christiansen | A01G 25/167 700/284 |
| 2006/0149837 A1 | 7/2006 | Weiner et al. | |
| 2006/0235739 A1 | 10/2006 | Levis et al. | |
| 2006/0248723 A1 | 11/2006 | Gustafson | |
| 2006/0254366 A1 | 11/2006 | Williamson et al. | |
| 2007/0043536 A1 | 2/2007 | Tonack et al. | |
| 2008/0042883 A1 | 2/2008 | Horstemeyer | |
| 2008/0055069 A1 | 3/2008 | Aiki et al. | |
| 2008/0302172 A1 | 12/2008 | Kates | |
| 2009/0063234 A1 | 3/2009 | Refsland et al. | |
| 2009/0099701 A1 | 4/2009 | Li et al. | |
| 2009/0216345 A1 | 8/2009 | Chrstfort | |
| 2009/0235992 A1 | 9/2009 | Armstrong | |
| 2009/0271045 A1 | 10/2009 | Savelle et al. | |
| 2009/0281672 A1 | 11/2009 | Pourzia | |
| 2009/0313077 A1 | 12/2009 | Wheeler, IV | |
| 2010/0042263 A1 | 2/2010 | Jacobsen et al. | |
| 2010/0100510 A1 | 4/2010 | Balaban et al. | |
| 2010/0109861 A1 | 5/2010 | Shah | |
| 2010/0250312 A1 | 9/2010 | Tarabzouni et al. | |
| 2010/0260325 A1 | 10/2010 | Clawson et al. | |
| 2010/0289652 A1 | 11/2010 | Javey et al. | |
| 2010/0305764 A1 | 12/2010 | Carr et al. | |
| 2011/0040595 A1 | 2/2011 | Chou et al. | |
| 2011/0093123 A1 | 4/2011 | Alexanian | |
| 2011/0106320 A1 | 5/2011 | Hall | |
| 2011/0114202 A1 | 5/2011 | Goseco | |
| 2011/0137827 A1 | 6/2011 | Mason et al. | |
| 2011/0166714 A1 | 7/2011 | Stachnik | |
| 2011/0178644 A1 | 7/2011 | Picton | |
| 2011/0195687 A1 | 8/2011 | Das et al. | |
| 2011/0238229 A1 | 9/2011 | Woytowitz et al. | |
| 2011/0248846 A1 | 10/2011 | Belov et al. | |
| 2011/0264282 A1 | 10/2011 | Blank et al. | |
| 2011/0298629 A1 | 12/2011 | Wilson | |
| 2011/0302995 A1 | 12/2011 | Lebeau et al. | |
| 2012/0010758 A1 | 1/2012 | Fancino et al. | |
| 2012/0014332 A1 | 1/2012 | Smith et al. | |
| 2012/0036091 A1 | 2/2012 | Cook | |
| 2012/0072175 A1 | 3/2012 | Hill et al. | |
| 2012/0095604 A1 | 4/2012 | Alexanian | |
| 2012/0109387 A1 | 5/2012 | Martin et al. | |
| 2012/0158192 A1 | 6/2012 | Sherwood | |
| 2012/0175425 A1 | 7/2012 | Evers et al. | |
| 2012/0210271 A1 | 8/2012 | Clawson | |
| 2012/0239211 A1 | 9/2012 | Walker et al. | |
| 2012/0254784 A1 | 10/2012 | Vander Griend et al. | |
| 2012/0256745 A1 | 10/2012 | Piett et al. | |
| 2012/0259540 A1 | 10/2012 | Kishore et al. | |
| 2012/0290140 A1 | 11/2012 | Groenveveld | |
| 2012/0295576 A1 | 11/2012 | Peterson | |
| 2013/0007501 A1 | 1/2013 | Areal et al. | |
| 2013/0060389 A1 | 3/2013 | Marsters et al. | |
| 2013/0130820 A1 | 5/2013 | Parks | |
| 2013/0222133 A1 | 8/2013 | Schultz et al. | |
| 2013/0338920 A1 | 12/2013 | Pasken et al. | |
| 2014/0005843 A1 | 1/2014 | Thomas | |
| 2014/0039695 A1 | 2/2014 | Andrews | |
| 2014/0039696 A1 | 2/2014 | Andrews | |
| 2014/0236868 A1 | 8/2014 | Cook | |
| 2014/0332088 A1 | 11/2014 | Senesh | |
| 2015/0032272 A1 | 1/2015 | Neesen et al. | |
| 2015/0070192 A1 | 3/2015 | Kates | |
| 2015/0095090 A1 | 4/2015 | Altieri et al. | |
| 2015/0100169 A1 | 4/2015 | McKinney | |
| 2015/0105921 A1 | 4/2015 | Shupe | |
| 2015/0120009 A1 | 4/2015 | Killian | |
| 2015/0319941 A1 | 11/2015 | Klein et al. | |
| 2016/0019560 A1 | 1/2016 | Benkert | |
| 2016/0057949 A1 | 3/2016 | Williams et al. | |
| 2016/0157446 A1 | 6/2016 | Bentwich | |
| 2017/0332566 A1 | 11/2017 | Emory et al. | |
| 2018/0317407 A1 | 11/2018 | Williams et al. | |
| 2019/0124857 A1* | 5/2019 | McClain | B05B 15/40 |
| 2019/0159411 A1 | 5/2019 | Gungl et al. | |
| 2019/0335689 A1 | 11/2019 | Neesen et al. | |
| 2019/0347836 A1 | 11/2019 | Sangireddy et al. | |
| 2019/0362444 A1 | 11/2019 | Terrell | |
| 2020/0305367 A1 | 10/2020 | Blejer | |
| 2021/0204495 A1 | 7/2021 | Andriolo et al. | |
| 2023/0247949 A1 | 8/2023 | Larsen | |
| 2023/0255151 A1 | 8/2023 | Larsen | |
| 2024/0224903 A1* | 7/2024 | Marsters | G05B 19/0426 |

OTHER PUBLICATIONS

Rainbird Corporation, "Commercial Central Control Systems", Brochure, 2012, 8pgs, D40064A, Tucson, AZ.

Rainbird Corporation, "ESP-LX Modular Controller Installation, Programming, & Operation Guide", User Manual, 2006, 88 pgs. 636281-010 Rev A, Tucson, AZ.

Rainbird Corporation, "IQ LXM-DTC Satellite Controller Installation & User Guide for the IQ Central Control System", User Manual, 2006, 82pgs, P/N 636544-010 Rev A, Tucson, AZ.

Rainbird Corporation, "IQ v2.0 Central Control Software and Software Feature Packs", Tech Spec, 2010, 2pgs, D40031, Tucson, AZ.

Maher, Ali Al Rantisi, Simulation of an Event-Driven Wireless Sensor Network Protocol for Environmental Monitoring. Article. [online], 2014 [retrieved on Jan. 9, 2019].

Smart Watering Systems, "Measure. Manage. Monitor Smart Watering Systems RBC Towers—Bentall Property Mississauga, Ontario 2010", Case Study/Flyer, 2010, 1 pg, Mississauga, Ontario, Canada.

Smart Watering Systems, "Measure. Manage. Monitor Smart Watering Systems Wynford Place—Brookfield Residential Toronto, Ontario 2011", Case Study/Flyer, 2011, 1 pg, Toronto, Ontario, Canada.

Smart Watering Systems, "Measure. Manage. Monitor Smart Watering Systems Yorkdale Mall—Oxford Properties Toronto, Ontario 2009", Case Study/Flyer, 2009, 1 pg, Toronto Ontario, Canada.

U.S. Appl. No. 13/899,544, Aug. 28, 2015, Office Action.
U.S. Appl. No. 13/899,544, Feb. 4, 2016, Notice of Allowance.
U.S. Appl. No. 14/922,838, Aug. 28, 2017, Office Action.
U.S. Appl. No. 14/922,838, Nov. 29, 2018, Office Action.
U.S. Appl. No. 14/922,838, Jun. 12, 2019, Office Action.
U.S. Appl. No. 14/922,838, Oct. 31, 2019, Office Action.
U.S. Appl. No. 14/922,838, Feb. 6, 2020, Notice of Allowance.
U.S. Appl. No. 16/864,475, Mar. 18, 2021, Office Action.
U.S. Appl. No. 16/864,475, Jul. 12, 2021, Notice of Allowance.
U.S. Appl. No. 16/864,475, Mar. 16, 2022, Office Action.
U.S. Appl. No. 16/864,475, Sep. 12, 2022, Notice of Allowance.
U.S. Appl. No. 16/395,621, Aug. 7, 2020, Office Action.
U.S. Appl. No. 16/395,621, Dec. 22, 2020, Office Action.

(56) References Cited

OTHER PUBLICATIONS

U.S. Appl. No. 16/395,621, Apr. 14, 2021, Office Action.
U.S. Appl. No. 16/395,621, Jul. 29, 2021, Notice of Allowance.
U.S. Appl. No. 17/530,455, Oct. 14, 2022, Office Action.
U.S. Appl. No. 18/096,987, Dec. 21, 2023, Office Action.
U.S. Appl. No. 18/096,987, Jul. 11, 2024, Office Action.
U.S. Appl. No. 18/140,349, Oct. 4, 2023, Office Action.
U.S. Appl. No. 18/140,349, Apr. 18, 2024, Office Action.
U.S. Appl. No. 18/140,349, Nov. 4, 2024, Office Action.
U.S. Appl. No. 14/922,838, May 6, 2020, Issue Notification.
U.S. Appl. No. 13/899,544, Mar. 23, 2016, Issue Notification.
U.S. Appl. No. 16/864,475, Dec. 28, 2022, Issue Notification.
U.S. Appl. No. 16/395,621, Nov. 10, 2021, Issue Notification.
U.S. Appl. No. 17/530,455, Feb. 14, 2023, Notice of Allowance.

* cited by examiner

DEVICES, SYSTEMS, AND METHODS FOR CLOUD-BASED IRRIGATION CONTROL

CROSS-REFERENCE TO RELATED APPLICATIONS

N/A.

BACKGROUND

Irrigation systems provide water to plants from a main water line, or water main. The water main has a capacity, which is typically measured in terms of a volumetric flow rate, such as gallons per minute (GPM). The water main capacity may be measured using other hydraulic parameter, such as pressure. Some irrigation systems may use one or more irrigation devices, such as a sprinkler head. These may help to deliver the irrigation water over an area. In some situations, the watering area to be irrigated (or watered) may utilize more water than is available from the water main. To water the entire watering area, an irrigation operator may separate this area into two or more zones. The irrigation devices in the zones may be connected the water main through a valve. The valve may be opened and closed using an irrigation controller.

In some situations, an irrigation controller may control multiple zones. For example, an irrigation controller may control 2, 3, 4, 5, 6, 7, 8, 9, 10, 15, 20, 30, 40, 50, or more zones. In some situations, the watering area may include more zones than a single irrigation controller may control. To irrigate the entire watering area, an irrigation operator may utilize multiple irrigation controllers. The irrigation controllers are typically installed at or near the physical location of their respective zones, thereby reducing the piping and/or wiring between the controller and the irrigation devices.

The irrigation operator may coordinate the operation of zones between the irrigation controllers. For example, the irrigation operator may plan which zones provide water for a particular period of time. In some situations, the irrigation operator may individually program each of the zones on each of the irrigation controllers. This may involve travelling to each of the irrigation controllers to program the irrigation controllers. However, this may be time-consuming. Further, individually programming the irrigation controllers may result in errors and/or be unresponsive to changing irrigation conditions. Accordingly, there is a need for a cloud-based irrigation controller that coordinates irrigation between different irrigation controllers.

BRIEF SUMMARY

In some aspects, the techniques described herein relate to a method for irrigation control. The method includes receiving, at a cloud-based irrigation controller, irrigation information for a first plurality of irrigation zones for a first irrigation controller and a second plurality of irrigation zones for a second irrigation controller. Based on the irrigation information, a stack is generated. The stack includes a set of irrigation zones. The set of irrigation zones includes a first irrigation zone from the first plurality of irrigation zones and a second irrigation zone of the second plurality of irrigation zones. The first irrigation zone and the second irrigation zone are actuated simultaneously.

In some aspects, the techniques described herein relate to a method for irrigation control. The method includes receiving first irrigation information for a plurality of irrigation zones for an irrigation controller. Updated irrigation information for the plurality of irrigation zones is received. Upon receipt of the updated irrigation information, a stack is generated to actuate a first irrigation zone from the plurality of irrigation zones and a second irrigation zone from the plurality of irrigation zones simultaneously.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 8-1 is a representation of a stack plot, according to at least one embodiment of the present disclosure;

FIG. 8-2 is a representation of an updated stack plot of the stack plot of FIG. 8-1;

DETAILED DESCRIPTION

Figure 1:
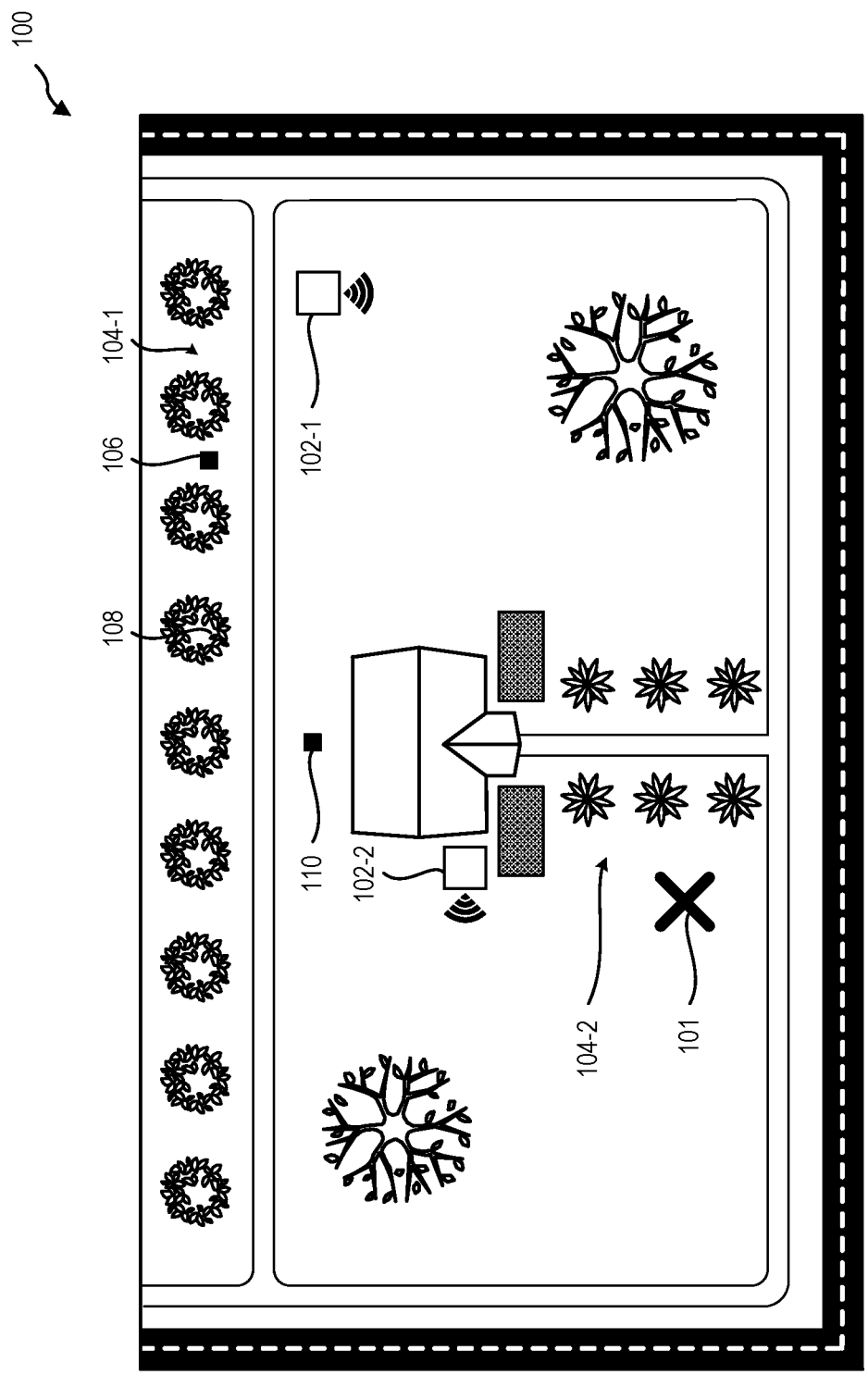
FIG. 1 is a representation of a cloud-based irrigation system, according to at least one embodiment of the present disclosure.

This disclosure generally relates to devices, systems, and methods for irrigation control. A watering area includes multiple zones operated by multiple local irrigation controllers. The local irrigation controllers may connect to a cloud-based irrigation controller. The cloud-based irrigation controller may tether each of the local irrigation controllers together. Put another way, each of the local irrigation controllers may be tethered to the cloud-based irrigation controller. Tethering the local irrigation controllers to the cloud-based irrigation controller may allow the cloud-based irrigation controller to coordinate actions between the local irrigation controllers. In this manner, the cloud-based irrigation controller may prepare irrigation instructions for the local irrigation controllers, such as irrigation time.

The cloud-based irrigation systems discussed herein provide many advantages and benefits over conventional systems and methods. For example, by connecting multiple local irrigation controllers to a cloud-based irrigation controller, the cloud-based irrigation system improves the versatility of an irrigation system relative to conventional systems. For example, the cloud-based irrigation system may allow an irrigation operator to adjust the programming of each irrigation controller without traveling to the local irrigation controller. This may allow the irrigation operator to quickly make adjustments to the programming, thereby improving the responsiveness while reducing the amount of time spent on programming the irrigation controllers.

In accordance with at least one embodiment of the present disclosure, the cloud-based irrigation system may make adjustments to the programming of the irrigation controllers based on input from the watering area. For example, the irrigation controllers may collect irrigation information, such as flow rates, soil chemistry, soil moisture levels, and other irrigation information. The cloud-based irrigation controller may provide the irrigation instructions based on the irrigation information. For example, the cloud-based irrigation controller may make a recommendation to delay or stop watering based on high moisture levels. This may help to improve the irrigation instructions provided by the cloud-based irrigation controller.

As illustrated by the foregoing discussion, the present disclosure utilizes a variety of terms to describe features and advantages of the cloud-based irrigation system. Additional detail is now provided regarding the meaning of such terms. For example, as used herein, the term "cloud-based" refers to a system that is at least partially implemented on the cloud. In particular, the term cloud-based can include any system or program that is implemented on a remote computing device. In some embodiments, the remote computing device may be a server on a server farm. In some embodiments, a cloud-based system may include a system implemented over the internet. For example, the cloud-based system may be in communication over the internet with local computing devices, such as local irrigation controllers.

The term "irrigation controller" may refer to an irrigation device that controls the flow of water to various zones. For example, the irrigation controller may be in control of various valves and other flow control devices, the actuation of which may cause water to flow to the various connected zones. In some embodiments, the irrigation controller may be programmable. For example, the irrigation controller may be programmable to adjust the sequence and/or timing of actuation of the valves or zones. In some embodiments, the irrigation controller may be in communication with the internet.

FIG. 1 is a representation of a cloud-based irrigation system 100, according to at least one embodiment of the present disclosure. The cloud-based irrigation system 100 includes a plurality of irrigation controllers (collectively 102). The irrigation controllers 102 may control the watering for a watering area. The watering area may include one or more watering zones (collectively 104). Each watering zone may include one or more irrigation devices 106. The irrigation devices 106 may provide water to one or more plants 108. The irrigation devices 106 may include any type of irrigation device, such as a spray head, a rotary head, a drip irrigation device, any other type of irrigation device, and combinations thereof. In some embodiments, an irrigation device 106 may water a single plant 108. In some embodiments, an irrigation device 106 may provide water to multiple plants 108. The plants 108 may include any type of plant, such as grass, shrubs, flowers, trees, garden plants, crops, any other type of plant, and combinations thereof.

Different irrigation controllers 102 may provide water to different irrigation zones 104. For example, a first irrigation controller 102-1 may control the irrigation to a first zone 104-1 and a second irrigation controller 102-2 may control the irrigation to a second zone 104-2. While two irrigation controllers 102 are shown each controlling a single zone 104, it should be understood that the watering area may include any number of irrigation controllers 102 watering any number of zones 104. For example, a single irrigation controller 102 may control 48 zones or any number of zones.

The irrigation controllers 102 may include any type of irrigation controller. For example, the irrigation controllers 102 may include a single-wire irrigation controller, with multiple valves or other irrigation devices connected to a single common wire. In some examples, the irrigation controllers 102 may include a "two-wire controller." A two-wire controller may connect multiple valves or other irrigation devices in series. A two-wire controller may allow for an increased number of connected valves. In some embodiments, the irrigation controllers 102 may include a wireless irrigation controller. For example, the irrigation controllers 102 may wirelessly connect to the valves and other connected irrigation devices. In some embodiments, the irrigation controllers 102 may include any type of irrigation controller connected to one or more valves in any way, including wired connections having any configuration, wireless connections, and combinations thereof. In some embodiments, the cloud-based irrigation system 100 may include multiple types of irrigation controllers 102.

The irrigation controllers 102 may include local irrigation programs for their associated zones 104. In some embodiments, an irrigation program may include a time of day to water for a particular zone 104 and/or set of zones 104. In some embodiments, an irrigation program may include a duration to water for a particular zone 104 and/or set of zones 104. In some embodiments, an irrigation program may include times during which to collect irrigation conditions from one or more sensors 110, as discussed herein. In some embodiments, the irrigation program may be a local irrigation program associated with the particular irrigation controller 102. In some embodiments, a local irrigation program may include controls for any other operation or combinations of operations performed by the irrigation controller 102.

In some embodiments, a single zone 104 may utilize all of the water provided by a water main. In some embodiments a single zone 104 may utilize a portion of the water provided by the water main. A zone 104 may be provided for a group of plants having similar watering patterns. In some examples, the zone 104 may be provided for a group of the same plant. In some embodiments, the zone 104 may be provided based on the capacity of the water main and the water usage of the irrigation devices 106. For example, a grassy field may include multiple zones 104, each of which max out the water main.

In some embodiments, selecting which zones 104 are simultaneously actuated may be referred to as "stacking" the irrigation system. Stacking the zones 104 may be based on any irrigation factor. For example, the zones 104 may be stacked to use all or most of the available water supply from the water main. This may result in zones 104 that are not adjacent to each other to be part of the same stack. In some examples, stacked zones 104 may have the same irrigation duration. In some examples, stacked zones 104 may have different durations. This may result in a first zone being actuated while a second zone is still running. In this manner, different zones having different durations may be stacked to reduce the opportunity costs of lost water supply from the water main.

In some embodiments, a stack may be a cross-controller stack that include two zones 104 associated with different irrigation controllers 102. For example, the first zone 104-1 and the second zone 104-2 may be simultaneously actuated as part of the same stack. Actuating zones 104 from different irrigation controllers 102 may allow the irrigation operator to utilize all of the water supply from the water main.

In accordance with at least one embodiment of the present disclosure, the cloud-based irrigation controller may prepare a cross-controller stack for zones that are associated with irrigation controllers 102 tethered to the cloud-based irrigation controller. For example, the cloud-based irrigation controller may review the zones 104, including the water consumption and other irrigation properties of the zones 104. Based on the irrigation properties, the cloud-based irrigation controller may prepare the cross-controller stack.

In some embodiments, when the cloud-based irrigation controller sends the irrigation instructions to the irrigation controllers 102, as discussed in further detail herein, the cloud-based irrigation controller may instruct the irrigation controllers 102 consistent with the cross-controller stack. In some embodiments, the cloud-based irrigation controller may send the entire cross-controller stack to each of the tethered irrigation controllers 102. In some embodiments, the cloud-based irrigation controller may only send the relevant instructions to the tethered irrigation controllers 102.

In some embodiments, the cloud-based irrigation controller may prepare a new stack based on new information received by the irrigation controllers 102 and/or the cloud-based irrigation controller. For example, the cloud-based irrigation controller may receive sensor information indicating that a particular zone 104 could use more water. The cloud-based irrigation controller may increase the watering duration for the zone 104. Based on the increase in watering duration for the zone 104, the cloud-based irrigation controller may adjust the cross-controller stack. For example, the cloud-based irrigation controller may adjust the day and/or the time of day for watering the zone. In some examples, the cloud-based irrigation controller may adjust which zones are simultaneously actuated with the particular zone. In this manner, the cloud-based irrigation controller may maintain the water usage of the cross-controller stack and reduce or prevent over-dedication of the water usage and/or lapses in full usage of the water supply.

As may be seen, the irrigation controllers 102 may be physically located within one of the zones 104 they control and/or proximate one or more of the zones 104 they control. For example, the first irrigation controller 102-1 is shown as proximate to the first zone 104-1. The second irrigation controller 102-2 is shown as proximate to the second zone 104-2. The irrigation controllers 102 may be located within or proximate the single zone 104 to reduce the wiring length and/or the piping to the valves and/or irrigation devices 106 of the respective zones. As discussed herein, to adjust the programming of the irrigation controllers 102, the irrigation operator may physically interact with the irrigation controllers 102, which may take time, effort, and money for the irrigation operator.

The cloud-based irrigation system 100 may include one or more sensors 110. The sensors 110 may detect irrigation conditions of the cloud-based irrigation system 100. For example, the sensors 110 may detect irrigation conditions of plants and/or soil in the watering area. For example, the sensors 110 may detect soil moisture, soil pH, soil chemistry, and other irrigation conditions of the plans and/or soil in the watering area. In some examples, the sensors 110 may detect flow rate information for one or more of the zones 104 and/or irrigation devices 106. In some examples, the sensors 110 may detect pressure information for one or more of the zones 104 and/or irrigation devices 106. In some examples, the sensors 110 may collect weather information. For example, the sensors 110 may detect temperature, humidity, rainfall, wind speed, wind direction, barometric pressure, any other weather information, and combinations thereof. In some embodiments, the sensors 110 may collect photographic information of all or a portion of the watering area. For example, the sensors 110 may collect photos of a patch of grass or plants. Plants may change colors based on over-watering, under-watering, nutrient levels, the presence of pests, the presence of weeds, temperature, any other condition, and combinations thereof.

In some embodiments, the sensors 110 may be in communication with the irrigation controllers 102. For example, one or more of the sensors 110 may be located within a zone associated with a particular irrigation controller 102, and the sensors 110 may be in communication (e.g., wired or wireless communication) with the irrigation controller 102. Put another way, the sensors 110 may communicate (e.g., wired or wirelessly) with the irrigation controllers 102. In some embodiments, the sensors 110 may receive power from the associate irrigation controller 102.

In accordance with at least one embodiment of the present disclosure, the irrigation controllers 102 may be in communication with the internet. Put another way, the irrigation controllers 102 may include a communication device that connects the irrigation controllers 102 to the internet. In some embodiments, the irrigation controllers 102 may have two-way communication with the internet. In some embodiments, the irrigation controllers 102 may be tethered to a cloud-based irrigation controller. For example, the irrigation controllers 102 may be tethered to the cloud-based irrigation controller over the internet. The cloud-based irrigation controller may receive irrigation information from the irrigation controllers 102 and provide irrigation instructions to the irrigation controllers 102.

While irrigation controllers 102 are described and illustrated as being in communication over the internet, it should be understood that the irrigation controllers may operate independent of the internet. For example, the irrigation controllers 102 may include local memory. The local memory may include the irrigation program for the local irrigation controller 102. The local irrigation controller 102 may implement the irrigation program from the local memory. This may help to reduce data usage and bandwidth requirements for the local irrigation controller 102. In some embodiments, if the local irrigation controller 102 is disconnected from the internet (for any reason), the local irrigation controller may still implement the local irrigation program. This may help to provide redundancy in the cloud-based irrigation system.

As discussed herein, the irrigation program may be stored on the local memory. In some embodiments, the local irrigation controller 102 may not be able to make changes to the irrigation program stored on the local memory. For example, an irrigation operator may not be able to adjust the irrigation program stored on the local memory. In some embodiments, the irrigation program may only be changed from an internet connection. In some embodiments, the irrigation program may be changed locally after receiving approval from the cloud-based irrigation controller to which the local irrigation controller 102 is tethered. This may help to prevent unintentional and/or unauthorized changes to the irrigation program.

In some embodiments, the irrigation controllers 102 may be constantly connected to the internet (except for unexpected internet outages). In some embodiments, the irrigation controllers 102 may periodically or episodically connect to the internet. For example, the irrigation controllers 102 may periodically connect to the internet every second, every 10 seconds, every 30 seconds, every minute, every 10 minutes, every 30 minutes, every hour, every 12 hours, every day, every week, every month, every season, every year, or any timeframe therebetween. In some embodiments, the irrigation controllers may episodically connect to the internet when an event occurs, such as when new equipment is installed, an alarm is triggered, a user instructs that irrigation controller, a certain amount of irrigation information has been collected, any other episode, and combinations thereof.

In some embodiments, the local memory may include a storage cache. The storage cache may store irrigation information collected by the local irrigation controller 102. In some embodiments, the local storage may store irrigation information until the irrigation information is uploaded to the cloud-based irrigation controller. For example, the local storage may store the irrigation information collected during an interruption to internet service, and may upload the irrigation information when internet service is restored. In some example the local storage may store the irrigation information between periodic or episodic internet connections, and may upload the stored irrigation information at the time of connection to the internet.

As discussed herein, the irrigation controllers 102 may provide the cloud-based irrigation controller with irrigation information. In some embodiments, the irrigation information may include irrigation conditions detected by the sensors 110. In some embodiments, the irrigation information may include details of the operation of the irrigation controllers 102. For example, the irrigation information may include the time a zone is water, the duration that a zone is watered, the flow rate associated with a zone, the pressure drop associated with a zone, any other information, and combinations thereof.

In some embodiments, the cloud-based irrigation controller may generate irrigation instructions and provide them to the tethered irrigation controllers 102. For example, the irrigation instructions may include a change to the irrigation program for one or more of the irrigation controllers 102. In some examples, the cloud-based irrigation controller may provide instructions regarding the time of day one or more zones 104 waters and/or the duration that one or more zones 104 waters.

The cloud-based irrigation controller may generate irrigation instructions using the irrigation information. For example, the cloud-based irrigation controller may generate the irrigation instructions based on the irrigation information received from the irrigation controllers 102. In some examples, the cloud-based irrigation controller may generate the irrigation instructions based on sensor readings from the sensors 110. The irrigation instructions may be at least partially based on the irrigation information. For example, the irrigation instructions may adjust a watering day, time of day and/or duration based on the irrigation information. In some examples, the irrigation instructions may adjust a watering day, time of day and/or duration based on irrigation conditions.

In some embodiments, the cloud-based irrigation controller may generate a master irrigation program. The master irrigation program may include watering days, times of day, and durations for the zones 104 in the watering area. For example, the master irrigation program may include watering days, times of day, and durations for each zone 104 associated with each irrigation controller 102 tethered to the cloud-based irrigation controller.

The master irrigation program may coordinate the watering between the various irrigation controllers 102 and zones 104. For example, the master irrigation program may coordinate the flow from the water main, improving use of the water supply during the watering window. In some embodiments, the master irrigation plan may be flexible and adaptable based on the changing irrigation conditions of the entire watering area. In this manner, the watering efficiency of the watering area may be improved, which may save money, water, and/or time.

Figure 2:
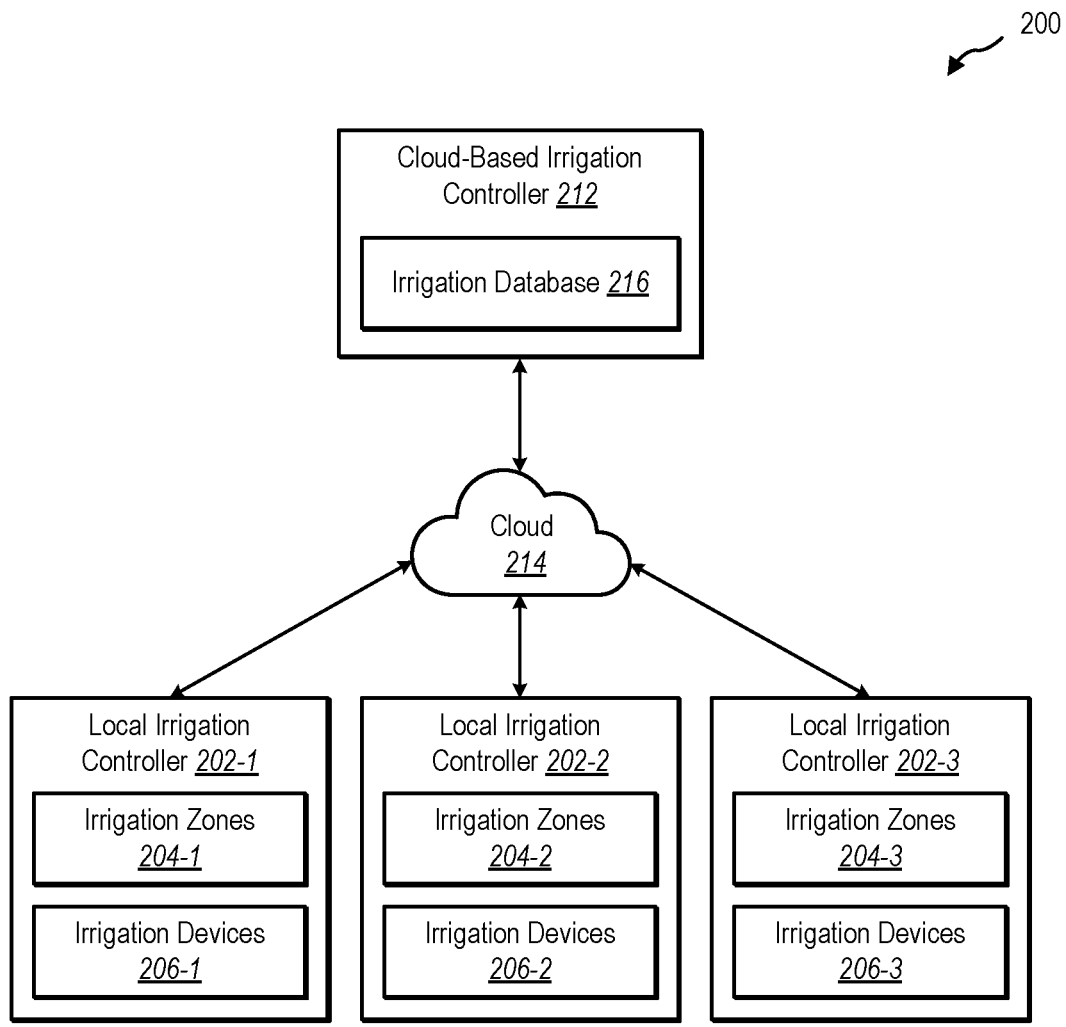
FIG. 2 is a schematic representation of a cloud-based irrigation system, according to at least one embodiment of the present disclosure.

FIG. 2 is a schematic representation of a cloud-based irrigation system 200, according to at least one embodiment of the present disclosure. The cloud-based irrigation system 200 may include a cloud-based irrigation controller 212. The cloud-based irrigation controller 212 may be connected to a plurality of local irrigation controllers (collectively 202). Put another way, the local irrigation controllers 202 may be tethered to the cloud-based irrigation controller 212. For example, a first local irrigation controller 202-1, a second local irrigation controller 202-2, and a third local irrigation controller 202-3 may be tethered to the cloud-based irrigation controller 212. While the embodiment shown includes three local irrigation controllers 202, it should be understood that the cloud-based irrigation system 200 may include any number of local irrigation controllers 202 tethered to the cloud-based irrigation controller 212.

The cloud-based irrigation controller 212 may be located on the cloud 214. For example, the cloud-based irrigation controller 212 may be a remote application that is implemented on a virtual machine in a cloud-computing environment. The local irrigation controllers 202 may be connected to or tethered to the cloud-based irrigation controller 212 over the cloud 214. For example, the local irrigation controllers 202 may be in communication with the cloud-based irrigation controller 212 over the internet.

The local irrigation controllers 202 may provide information to the cloud-based irrigation controller 212 over the cloud 214. For example, the local irrigation controllers 202 may, over the internet, provide information to the cloud 214 and the cloud-based irrigation controller 212 located on the cloud 214. In some embodiments, the cloud-based irrigation controller 212 may include an irrigation database 216. The cloud-based irrigation controller 212 may store the irrigation information provided by the local irrigation controllers 202 on the irrigation database 216.

The irrigation information may include information from the irrigation zones (collectively 204) associated with the local irrigation controllers 202. A first irrigation zone 204-1 may be associated with the first local irrigation controller 202-1, a second irrigation zone 204-2 may be associated with the second local irrigation controller 202-2, and a third irrigation zone 204-3 may be associated with the third local irrigation controller 202-3. The local irrigation controllers 202 may divert or control water flow to one or more irrigation devices (collectively 206). The irrigation devices 206 may direct the water to the plants within the zone. First irrigation devices 206-1 may be associated with the first irrigation zone 204-1 and the first local irrigation controller 202-1, second irrigation devices 206-2 may be associated with the second irrigation zone 204-2 and the second local irrigation controller 202-2, and third irrigation devices 206-3 may be associated with the third irrigation zone 204-3 and the third local irrigation controller 202-3.

The cloud-based irrigation controller 212 may provide the local irrigation controllers 202 with irrigation instructions. The irrigation instructions may provide instructions to control the operation of the local irrigation controllers 202. For example, the irrigation instructions may include the day, time of day, and/or duration of the watering of the irrigation zones, such as by controlling when the local irrigation controllers 202 open and close valves that divert water to the irrigation devices 206.

In accordance with at least one embodiment of the present disclosure, the cloud-based irrigation controller 212 may generate the irrigation instructions based on irrigation information stored in the irrigation database 216. For example, the cloud-based irrigation controller 212 may review the irrigation information on the irrigation database 216 to prepare the irrigation instructions. In some embodiments, the cloud-based irrigation controller 212 may review the irrigation information provided by two or more of the local irrigation controllers 202 to generate the irrigation instructions.

The irrigation instructions may be pushed to each local irrigation controllers 202 individually. For example, the cloud-based irrigation controller 212 may generate a first set of irrigation instructions for the first local irrigation controller 202-1, a second set of irrigation instructions for the second local irrigation controller 202-2, and a third set of irrigation instructions for the third local irrigation controller 202-3. In some embodiments, the irrigation instructions associated with the local irrigation controllers 202 may be specific to each local irrigation controller 202. Put another way, the specific irrigation instructions may include instructions for only the irrigation zones 204 associated with the related local irrigation controller 202. In some embodiments, the irrigation instructions may include the instructions for each of the irrigation zones 204 associated with each local irrigation controllers 202. The local irrigation controller 202 may pull from the irrigation instructions the relevant irrigation instructions for its associated irrigation zones 204.

In some embodiments, the cloud-based irrigation controller 212 may assign one or more roles to the local irrigation controllers 202. For example, the cloud-based irrigation controller 212 may assign a role of a master local irrigation controller 202 based on control of a master valve to the water main. For example, a master valve may be a valve that controls water inflow from the water main to the various irrigation devices 206. In some embodiments, a master local irrigation controller 202 may control actuation of a master valve. In some embodiments, the master local irrigation controller 202 may open or close the master valve during watering of any zone 204 from any local irrigation controller 202. In some embodiments, the master local irrigation controller 202 may have the entire watering program for the cloud-based irrigation system 200 to control the opening of the master valve. In some embodiments, multiple local irrigation controllers 202 may be designated a master irrigation controller 202. In some embodiments, the cloud-based irrigation system 200 may include multiple master valves controlled by a single master local irrigation controller 202. In some embodiments, multiple master valves may be controlled by multiple master local irrigation controllers. In some embodiments, a single master valve may be controlled by multiple master local irrigation controllers.

In accordance with at least one embodiment of the present disclosure, the cloud-based irrigation controller 212 may implement new features or programs on the local irrigation controllers 202. The cloud-based irrigation controller 212 may push updates to the local software or operating system of the local irrigation controllers 202. This may allow the local irrigation controllers 202 to implement the updated features or programs without replacing any of the hardware components of the local irrigation controllers 202. This may allow the local irrigation controllers 202 to control new types of irrigation devices 206, new sensors (e.g., sensors 110 of the cloud-based irrigation system 100 of FIG. 1), implement new automatic shutoff conditions, implement any other type of update, and combinations thereof. Conventionally, to implement new updates, the local irrigation controllers 202 may be replaced. By tethering the local irrigation controllers 202 to the cloud-based irrigation controller 212, the cloud-based irrigation controller 212 may implement new updates without replacing the hardware of the local irrigation controllers 202, thereby reducing the cost and increasing the speed and ease of implementation of the updates.

Figure 3:
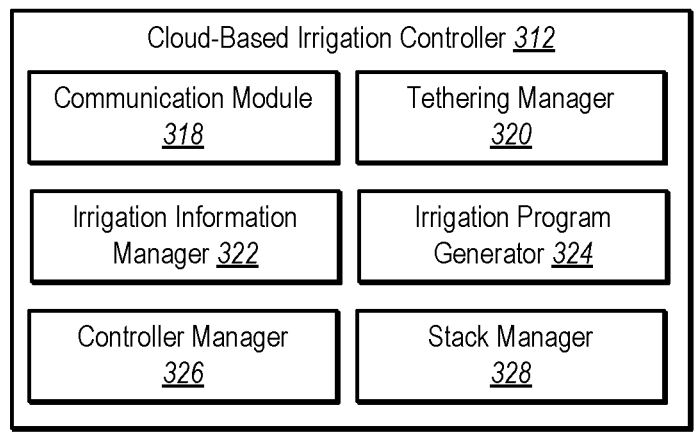
FIG. 3 is a schematic representation of a cloud-based irrigation controller, according to at least one embodiment of the present disclosure.

FIG. 3 is a schematic representation of a cloud-based irrigation controller 312, according to at least one embodiment of the present disclosure. Each of the components of the cloud-based irrigation controller 312 can include software, hardware, or both. For example, the components can include one or more instructions stored on a computer-readable storage medium and executable by processors of one or more computing devices, such as a client device or server device. When executed by the one or more processors, the computer-executable instructions of the cloud-based irrigation controller 312 can cause the computing device(s) to perform the methods described herein. Alternatively, the components can include hardware, such as a special-purpose processing device to perform a certain function or group of functions. Alternatively, the components of the cloud-based irrigation controller 312 can include a combination of computer-executable instructions and hardware.

Furthermore, the components of the cloud-based irrigation controller 312 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The cloud-based irrigation controller 312 may be tethered to one or more local irrigation controllers. The cloud-based irrigation controller 312 may provide irrigation instructions to control the operation of the local irrigation controllers. The cloud-based irrigation controller 312 may include a communication module 318. The communication module 318 may communicate with the tethered local irrigation controllers. For example, the communication module 318 may communicate with the tethered local irrigation controllers over the internet. In some examples, the communication module 318 may communicate with the tethered local irrigation controllers over a wireless network, such as WiFi or a cellular network. Put another way, the communication module 318 may wirelessly connect over the internet with the tethered local irrigation controller.

In some embodiments, the cloud-based irrigation controller 312 may include a tethering manager 320. The tethering manager 320 may control the tethering of local irrigation controllers. For example, the cloud-based irrigation controller 312 may receive a tethering request from a local irrigation controller from the communication module 318. The tethering request may include information regarding the local irrigation controller, such as a controller ID, a controller location, a requested tethering group, any other tethering information, and combinations thereof. The tethering manager 320 may review the tethering request. In some embodiments, the tethering manager 320 may determine whether the requesting local irrigation controller should be tethered to the cloud-based irrigation controller 312. For example, the tethering manager 320 may determine, based on a tethering group list on an irrigation database, a local irrigation controller location with respect to the tethering group, authorization information from an operator, any other criteria, and combinations thereof. If the tethering manager 320 approves the tethering, the tethering manager 320 may tether the local irrigation controller to the cloud-based irrigation controller 312. In some embodiments, the tethering manager 320 may receive input from an irrigation operator to approve tethering of an irrigation controller to the cloud-based irrigation controller 312.

The cloud-based irrigation controller 312 includes an irrigation information analyzer 322. As discussed herein, the cloud-based irrigation controller 312 may receive, through the communication module 318, irrigation information from the tethered local irrigation controllers. The irrigation information analyzer 322 may review the irrigation information. For example, the irrigation information analyzer 322 may analyze the irrigation information for trends in watering. In some examples, the irrigation information analyzer 322 may analyze the irrigation information for changes in irrigation conditions. In some examples, the irrigation information analyzer 322 may analyze the irrigation information for zones and/or plants that are stressed. In some examples, the irrigation information analyzer 322 may determine or infer the source of the stress. For example, the irrigation information analyzer 322 may determine or infer that the stress is due to too little water, too much water, pests, weeds, weather conditions, any other source, and combinations thereof.

An irrigation program manager 324 may, based on the analysis by the irrigation information analyzer 322, adjust the irrigation program for one or more of the tethered irrigation controllers. For example, the irrigation program manager 324 may adjust the watering day, time of day, duration, or portion of the irrigation program for one or more irrigation zones of a tethered local irrigation controller. In some embodiments, the irrigation program manager 324 may generate a new irrigation program for one or more tethered local irrigation controllers. In some embodiments, the irrigation program manager 324 may adjust the irrigation program based on irrigation information from zones associated with two or more tethered irrigation controllers.

In some embodiments, the irrigation program manager 324 may prepare recommendations for the tethered local irrigation controllers. The recommendations may be based on the irrigation information received from the tethered local irrigation controllers. For example, the irrigation program manager 324 may prepare a recommendation to transfer a zone between local irrigation controllers. This may help to reduce losses and/or improve efficiencies by adjusting the zones to be more efficiently located. In some examples, the irrigation program manager 324 may prepare a recommendation to add a zone, split a zone, or otherwise adjust the zones of one or more local irrigation controllers. In some examples, the irrigation program manager 324 may prepare a recommendation to transfer an irrigation device between zones and/or local irrigation controllers. In some examples, the irrigation program manager 324 may prepare a recommendation to change types of an irrigation device, remove an irrigation device, add an irrigation device, adjust settings of an irrigation device, otherwise recommend a change related to an irrigation device, and combinations thereof.

In some embodiments, the irrigation program manager 324 may provide the recommendation to an irrigation operator. The irrigation operator may review the recommendation and implement the change. This may involve physically adjusting piping, valves, and/or irrigation devices to implement the recommended change. Providing recommendations to adjust zones and/or irrigation devices may help to improve the efficiency of the cloud-based irrigation system.

The cloud-based irrigation controller 312 includes a controller manager 326. The controller manager 326 may send the recommendations to the irrigation operator and/or the irrigation instructions to the local irrigation controller. In some embodiments, the controller manager 326 may determine when to send the recommendations and/or the irrigation instructions. In some embodiments, the controller manager 326 may track the operation of the components connected to the local irrigation controller. For example, the local irrigation controller may keep track of actuation cycles, operating time, operating efficiency, and so forth. The controller manager 326 may review the operating information and provide recommendations to replace information based on this information. This may help to improve the maintenance of the cloud-based irrigation system.

In some embodiments, the controller manager 326 may review operating parameters for the local irrigation controllers. For example, the controller manager 326 may review alert triggers. An alert trigger may be an operating condition of one or more components connected to a local irrigation controller that indicates damage to a portion of the irrigation system and/or indicates operation of the irrigation that is not outside of operating parameters. For example, an alert trigger may include a flow rate through a particular pipe or flow rate sensor. If the flow rate exceeds the alert trigger flow rate, then the local irrigation controller may send an alert to the cloud-based irrigation controller 312. This may indicate a damaged pipe, a damaged irrigation device, other damage to the irrigation system, and combinations thereof.

The controller manager 326 may review the alert triggers. Based on operating conditions, the controller manager 326 may determine one or more changes to the alert triggers. In some embodiments, the controller manager 326 may determine new alert triggers. In some embodiments, the controller manager 326 generate a recommendation to install a new irrigation sensor and determine alert triggers associated with the new irrigation sensor.

The cloud-based irrigation controller 312 may include a stack manager 328. The stack manager 328 may prepare a stack of zones actuated simultaneously. For example, the irrigation information analyzer 322 may review the water usage and other irrigation properties of the zones. The stack manager 328 may determine which zones may be actuated simultaneously based on the water supply from the water main. The stack manager 328 may generate a stack to use all of or as much of the water supply as possible. The stack manager 328 may generate a stack using any operating conditions. For example, the stack manager 328 may generate a stack based on the water consumption of zones and the total water supply of the water main.

In some embodiments, the stack manager 328 may generate a stack based on one or more watering constraints. For example, a watering constraint may include a watering period, which may be a day, a time of day, or other period in which irrigation is approved, the water supply is available, or otherwise watering is possible. In some examples, a watering constraint may include a zone that is watered at a particular time of day or within a range of times of day. In some examples, a watering constraint may include one or more priority zones. A priority zone may include a zone that is watered at a particular time, with a particular volume of water, that is watered at the expense of other zones (e.g., scheduled before the other zones), otherwise prioritized, and combinations thereof.

In some embodiments, the stack manager 328 may generate a cross-controller stack. The cross-controller stack may incorporate zones from different local irrigation controllers. A cross-controller stack may help to improve the usage of the water supply. The stack manager 328 may generate the cross-controller stack based on the total water consumption for all the zones and/or any watering constraint.

In some embodiments, the stack manager 328 may create new stacks and/or cross-controller stacks based on the irrigation information received from the local irrigation controllers. In this manner, as new irrigation information is received, the stack manager 328 may create a new stack and/or cross-controller stack that accommodates the new irrigation information. This may help the cloud-based irrigation system to utilize as much of the water supply from the water main as possible as irrigation conditions change. In some embodiments, the stack manager 328 may automatically generate a new stack and/or cross-controller stack based on new and/or updated information received from the tethered local irrigation controllers.

In some embodiments, the stack manager 328 may generate a new stack and/or cross-controller stack based on the new irrigation information. For example, when the irrigation information analyzer 322 receives irrigation information, the irrigation information analyzer 322 may determine whether the irrigation information is new and/or represents a change in conditions. The irrigation program manager 324 may prepare a change to the irrigation program. Based on the change in the program and/or the new irrigation information or change in conditions, the stack manager 328 may generate a new stack. In some embodiments, this process may be automatic. For example, as soon as the irrigation information analyzer 322 and/or the irrigation program manager 324 determines that there is a new irrigation information and/or a change in irrigation conditions, the stack manager 328 may generate a new stack and/or a new cross-controller stack. In this manner, the stack manager 328 may help to utilize the water supply of the water main.

Figure 4:
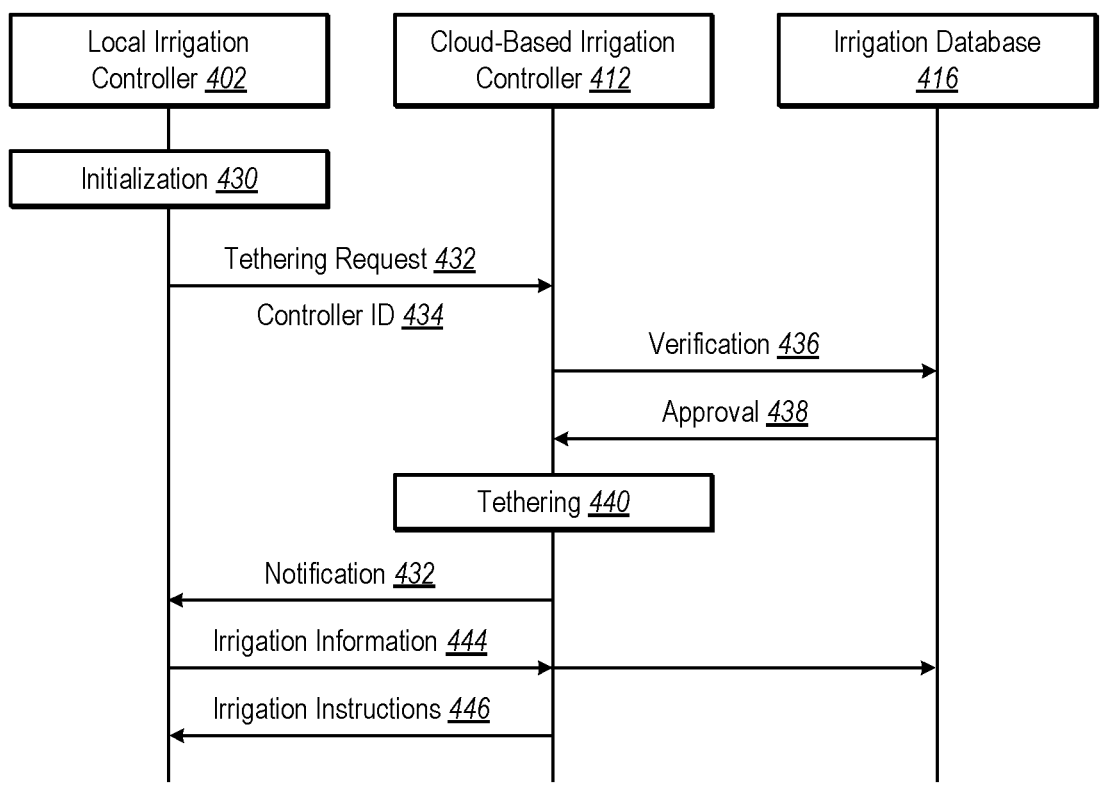
FIG. 4 is a string diagram of a cloud-based irrigation system, according to at least one embodiment of the present disclosure.

FIG. 4 is a string diagram of a cloud-based irrigation system, according to at least one embodiment of the present disclosure. The string diagram includes a local irrigation controller 402, a cloud-based irrigation controller 412, and an irrigation database 416 in communication with each other. In some embodiments, the local irrigation controller 402 may undergo initialization 430. During initialization 430, the local irrigation controller 402 may connect to the internet. For example, the local irrigation controller 402 may be connected to the internet using a wireless connection, such as a Wi-Fi and/or a cellular connection. Put another way, the local irrigation controller 402 may wirelessly connect to the internet.

In some embodiments, prior to and/or during initialization 430, the local irrigation controller 402 may receive initial irrigation instructions. For example, an irrigation operator may program the initial irrigation instructions in the local irrigation controller 402. In some examples, the local irrigation controller 402 may not receive any initial irrigation instructions. In some embodiments, during initialization, the local irrigation controller 402 may receive an indication that it should be tethered to the cloud-based irrigation controller 412. For example, an irrigation operator may program the indication that the local irrigation controller 402 should be tethered to the cloud-based irrigation controller 412. In some examples, the local irrigation controller 402 may include an indication to tether to the cloud-based irrigation controller 412 upon the first startup and/or connection to the internet.

To tether the local irrigation controller 402 to the cloud-based irrigation controller 412, the local irrigation controller 402 may send a tethering request 432 to the cloud-based irrigation controller 412. The tethering request 432 may include a request to tether to the cloud-based irrigation controller 412. In some embodiments, the tethering request 432 may include tethering information. For example, the tethering request 432 may include a controller ID 434. The controller ID 434 may include identifying information for the local irrigation controller 402 and/or the connected equipment. For example, the controller ID 434 may include a unique identification of the local irrigation controller 402, a location of the local irrigation controller 402, zones associated with the local irrigation controller 402, irrigation devices associated with the local irrigation controller 402, irrigation sensors associated with the local irrigation controller 402, any other identifying information, and combinations thereof.

When the cloud-based irrigation controller 412 receives the tethering request 432, the cloud-based irrigation controller 412 may send the tethering request 432 to the irrigation database 416 for verification 436. The irrigation database 416 may include data about various irrigation controllers, including tethering information for tethering local irrigation controllers to the cloud-based irrigation controller 412. The tethering information may include controller IDs that are approved to be connected to the cloud-based irrigation controller 412, watering area locations, local irrigation controller locations, zone locations, authentication keys, any other tethering information, and combinations thereof.

The cloud-based irrigation controller 412 may review, in the irrigation database 416, the identifying information from the controller ID 434 to determine whether the local irrigation controller 402 should be tethered to the cloud-based irrigation controller 412. For example, the cloud-based irrigation controller 412 may review the irrigation database 416 to determine whether the controller ID 434 correlates to the tethering information in the irrigation database 416. In some examples, the cloud-based irrigation controller 412 may determine whether the local irrigation controller 402 is associated with the watering area of a cloud-based irrigation system, zones of the local irrigation controller 402 are located within the watering area, irrigation devices are located within the watering area, or whether any other controller ID 434 are associated with the tethering data of the cloud-based irrigation controller 412 in the irrigation database 416.

If the comparison between controller ID 434 and the tethering data in the irrigation database 416 indicates that the local irrigation controller 402 should be tethered to the cloud-based irrigation controller 412, the cloud-based irrigation controller 412 may receive an approval 438.

Upon receipt of the approval 438, the cloud-based irrigation controller 412 may tether 440 the local irrigation controller 402 to the cloud-based irrigation controller 412. Tethering 440 the local irrigation controller 402 to the cloud-based irrigation controller 412 may allow the cloud-based irrigation controller 412 to incorporate the local irrigation controller 402 into the cloud-based irrigation system. This may allow the cloud-based irrigation controller 412 to receive irrigation information from the local irrigation controller 402 and/or to provide irrigation instructions to the local irrigation controller 402.

After tethering, the local irrigation controller 402 may receive a notification 442 from the cloud-based irrigation controller 412 indicating that the local irrigation controller 402 is tethered to the cloud-based irrigation controller 412. In some embodiments, the notification 442 may indicate to the local irrigation controller 402 that local irrigation controller 402 is approved to receive irrigation instructions from the cloud-based irrigation controller 412.

In some embodiments, the notification 442 may include instructions that lock the local irrigation controller 402 from receiving instructions from another cloud-based irrigation controller 412. In some embodiments, the notification 442 may include instructions that lock the local irrigation controller 402 from receiving instructions from any other source. For example, the notification 442 may include instructions that lock the local irrigation controller 402 from receiving instructions or programming changes at the physical local irrigation controller 402 device. In some embodiments, the notification 442 may include an override that may allow an operator having the appropriate key to prepare changes to the local irrigation controller 402 at the physical local irrigation controller 402 device.

The local irrigation controller 402 may provide irrigation information 444 to the cloud-based irrigation controller 412. In some embodiments, the local irrigation controller 402 may provide the irrigation information 444 to the irrigation database 416. In some embodiments, the cloud-based irrigation controller 412 may store the irrigation information 444 on the irrigation database 416.

In some embodiments, as discussed herein, based on the irrigation information 444, the cloud-based irrigation controller 412 may provide the local irrigation controller 402 with irrigation instructions 446. For example, the cloud-based irrigation controller 412 may adjust one or more of the zones of the local irrigation controller 402, adjust the stack of the local irrigation controller 402, including all the stacks of the tethered local irrigation controller 402. In this manner, the cloud-based irrigation controller 412 may control each of the tethered local irrigation controllers 402.

Figure 5:
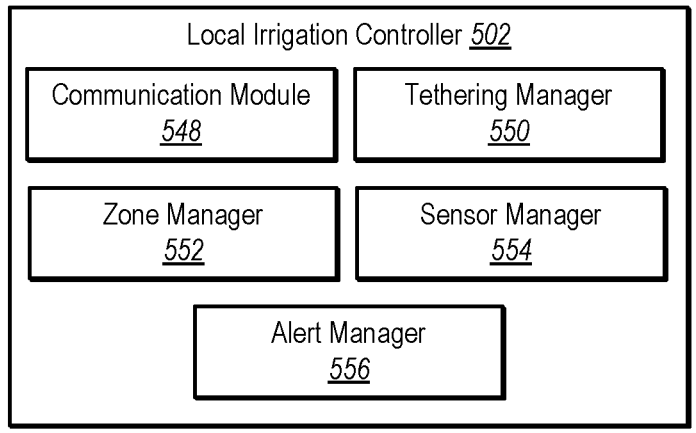
FIG. 5 is a schematic representation of a local irrigation controller, according to at least one embodiment of the present disclosure.

FIG. 5 is a schematic representation of a local irrigation controller 502, according to at least one embodiment of the present disclosure. Each of the components of the local irrigation controller 502 can include software, hardware, or both. For example, the components can include one or more instructions stored on a computer-readable storage medium and executable by processors of one or more computing devices, such as a client device or server device. When executed by the one or more processors, the computer-executable instructions of the local irrigation controller 502 can cause the computing device(s) to perform the methods described herein. Alternatively, the components can include hardware, such as a special-purpose processing device to perform a certain function or group of functions. Alternatively, the components of the local irrigation controller 502 can include a combination of computer-executable instructions and hardware.

Furthermore, the components of the local irrigation controller 502 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The local irrigation controller 502 includes a communication module 548. The communication module 548 may be connected to the internet. For example, the communication module 548 may be connected to the internet using a wired connection. In some examples, the communication module 548 may be connected to the internet using a wireless connection, such as a Wi Fi connection or a cellular connection. Put another way, the communication module 548 may wirelessly connect to the internet.

The communication module 548 may place the local irrigation controller 502 in communication with a cloud-based irrigation controller. For example, the communication module 548 may connect to the cloud-based irrigation controller over the internet. A tethering manager 550 may identify that the local irrigation controller 502 may be tethered to the cloud-based irrigation controller. The tethering manager 550 may transmit a tethering request to the cloud-based irrigation controller with the communication module 548. The tethering manager 550 may collect controller ID information about the local irrigation controller 502, such as an identifier, zone information, irrigation device information, location information, any other controller ID information, and combinations thereof. The tethering manager 550 may transmit the tethering request including the controller ID to the cloud-based irrigation controller.

As discussed herein, the cloud-based irrigation controller may review the tethering request and/or approve the tethering request. The tethering manager 550 may receive the notification that the local irrigation controller 502 is tethered to the cloud-based irrigation controller through the communication module 548. The tethering manager 550 may then finalize the tethering of the local irrigation controller 502 to the cloud-based irrigation controller.

The local irrigation controller 502 may include a zone manager 552. The zone manager 552 may control the irrigation of the various zones. For example, the zone manager 552 may control the actuation of one or more valves. The valves may be associated with an irrigation zone. When the zone manager 552 actuates the valve, the irrigation devices within the irrigation zone may be connected to the water supply from the water main. This may cause the irrigation devices to emit water, thereby irrigating the zone.

The zone manager 552 may actuate the zones based on an irrigation program. The irrigation program may include a day, time of day, duration, other information regarding the actuation of the zones, and combinations thereof. In some embodiments, as discussed herein, the zone manager 552 may include an irrigation stack, which may include multiple zones that may be simultaneously actuated.

In accordance with at least one embodiment of the present disclosure, the communication module 548 may receive irrigation instructions from the cloud-based irrigation controller. The irrigation instructions may include changes to the irrigation program. The changes to the irrigation program may include changes to the day, time of day, duration, and other information regarding the actuation of the zones, and combinations thereof. Based on the received irrigation instructions, the zone manager 552 may adjust the actuation of the zones. In this manner, the local irrigation controller 502 may implement the irrigation instructions received from the cloud-based irrigation controller.

In some embodiments, the zone manager 552 may implement the programmed irrigation program until the local irrigation controller 502 receives new irrigation instructions from the cloud-based irrigation controller. In some embodiments, the zone manager 552 may periodically and/or episodically query the cloud-based irrigation controller for new irrigation instructions. For example, the zone manager 552 may periodically query the cloud-based irrigation controller at the start of every irrigation program. In some examples, the zone manager 552 may periodically query the cloud-based irrigation controller on a schedule, such as every day, every week, every month, every watering season, every year, or any period therebetween. In some examples, the zone manager 552 may episodically query the cloud-based irrigation controller based on a triggering event. For example, the triggering event may include the receipt of new irrigation information from one or more sensors, the connection of a new zone, the installation of a new irrigation device, the triggering of an alert, any other triggering event, and combinations thereof. Based on the query, the zone manager 552 may wait for new irrigation instructions and, if they are received, implement the revised irrigation program.

The local irrigation controller 502 includes a sensor manager 554. The sensor manager 554 may manage the collection of irrigation information from one or more sensors connected to the local irrigation controller 502. For example, the sensor manager 554 may be connected to flow rate sensors, soil pH sensors, soil chemistry sensors, soil moisture sensors, weather sensors, cameras, any other sensor, and combinations thereof. The sensor manager 554 may include a sensing program. The sensing program may include sensing time, frequency, location, and so forth. The sensor manager 554 may collect the sensor measurements according to the sensing program. The sensed measurements may be part of the irrigation information collected by the local irrigation controller 502.

In accordance with at least one embodiment of the present disclosure, the communication module 548 may transmit the sensed measurements to the cloud-based irrigation controller. In some embodiments, the communication module 548 may transmit the sensed measurements as they are collected. In some embodiments, the communication module 548 may transmit the sensed measurements to the cloud-based irrigation controller on a schedule, such as after every irrigation program, daily, weekly, monthly, seasonally, yearly, and so forth. In this manner, the local irrigation controller 502 may provide the sensed measurements to the cloud-based irrigation controller. The cloud-based irrigation controller may review the sensed measurements and make adjustments to the irrigation program and/or the measurement program.

In some embodiments, the communication module 548 may receive measurement instructions from the cloud-based irrigation controller. The measurement instructions may include adjustments to the measurement program. For example, the measurement instructions may include adjustments to the measurement frequency, the measurement time, the measurement type, and so forth. In some embodiments, the measurement instructions may include recommendations for an irrigation operator to add a new sensor, replace a sensor, remove a sensor, or otherwise adjust the sensors of the cloud-based irrigation system.

The local irrigation controller 502 includes an alert manager 556. The alert manager 556 may review the collected irrigation information at the local irrigation controller 502 for one or more alert triggers. For example, the alert manager 556 may review the measurements from the sensors collected by the sensor manager 554. If one of the measurements exceeds one of the associated alert triggers, the alert manager 556 may generate an alert. In some embodiments, the local irrigation controller 502 may transmit the alert to the cloud-based irrigation controller using the communication module 548.

The alert trigger may be any type of measurement and/or alert. For example, the alert trigger may include a flow rate trigger. If a particular flow rate sensor measures a flow rate that exceeds the flow rate trigger, then the alert manager 556 may generate an alert which the communication module 548 may send to the cloud-based irrigation controller 412. In some embodiments, the alert manager 556 may associate a cause with the alert. For example, the alert manager 556 may associate a broken pipe or irrigation device with the flow rate trigger. In some examples, the alert trigger may be a soil moisture alert trigger, a soil pH alert trigger, a soil chemistry alert trigger, a weather alert trigger (e.g., temperature, wind, precipitation), a plant color alert trigger, any other alert trigger, and combinations thereof. In some embodiments, two or more measurements may be tied to an alert. For example, soil moisture and plant color may be associated with an over/under watering alert.

In some embodiments, and as discussed herein, based on the receipt of the measurements, the cloud-based irrigation controller may adjust the measurement program. For example, the cloud-based irrigation controller may adjust the alert triggers based on the received measurements. In some examples, the cloud-based irrigation controller may adjust the alert trigger to indicate a change of watering conditions. For example, a first alert trigger may indicate a first set of conditions, and a second alert trigger may indicate a second set of conditions, such as a progression of a plant disease or watering level.

FIGS. 6, 7, and 9-11, the corresponding text, and the examples provide a number of different methods, systems, devices, and non-transitory computer-readable media of the cloud-based irrigation system. In addition to the foregoing, one or more embodiments can also be described in terms of flowcharts comprising acts for accomplishing a particular result, as shown in FIGS. 6, 7, and 9-11. FIGS. 6, 7, and 9-11 may be performed with more or fewer acts. Further, the acts may be performed in differing orders. Additionally, the acts described herein may be repeated or performed in parallel with one another or parallel with different instances of the same or similar acts.

Figure 6:
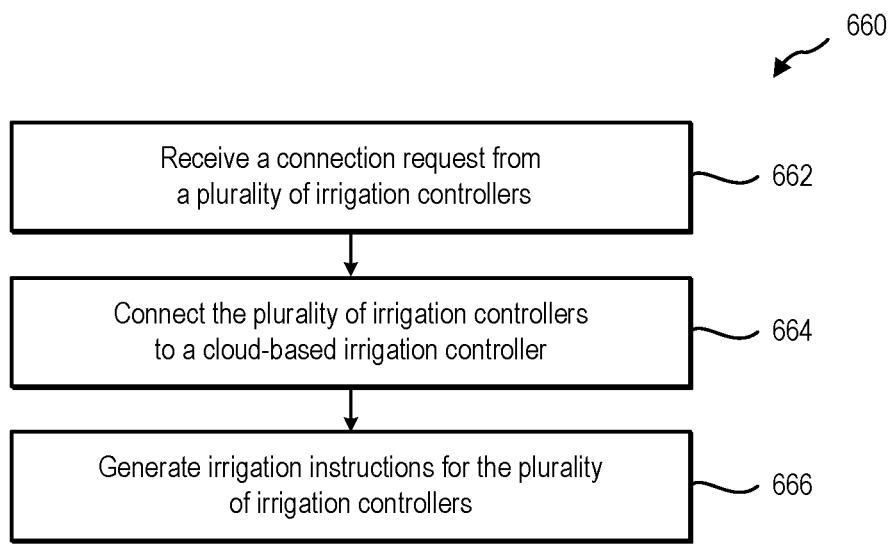
FIG. 6 is a flowchart of a method for irrigation control, according to at least one embodiment of the present disclosure.

As mentioned, FIG. 6 illustrates a flowchart of a method 660 of a series of acts for irrigation control, according to at least one embodiment of the present disclosure. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6. The method 660 illustrated in FIG. 6 may be implemented by the cloud-based irrigation controller 312 shown in FIG. 3. Put another way, the cloud-based irrigation controller 312 of FIG. 3 may implement the method 660 of FIG. 6.

The cloud-based irrigation controller may receive a connection request from a plurality of irrigation controllers at 662. Each of the irrigation controllers may control a plurality of irrigation zones. For example, each of the irrigation controllers may be local irrigation controllers, as discussed herein. The local irrigation controllers may be associated with irrigation zones and the irrigation devices located therein.

The cloud-based irrigation controller may connect or tether the plurality of irrigation controllers to itself at 664. For example, upon review of a controller ID and/or comparison of the controller ID with an irrigation database, the cloud-based irrigation controller may determine that the local irrigation controller is associated with the cloud-based irrigation controller. The plurality of irrigation controllers may be tethered to the cloud-based irrigation controller.

In accordance with at least one embodiment of the present disclosure, the cloud-based irrigation controller may receive irrigation information from the local irrigation controller. Using the irrigation information, the cloud-based irrigation controller may generate irrigation instructions for one or more of the irrigation controllers at 666. In this manner, the cloud-based irrigation controller may remotely control the irrigation of the watering area of the cloud-based irrigation system. This may help to improve the watering efficiency and/or the flexibility of operation of the watering system.

As discussed herein, the cloud-based irrigation controller may receive irrigation information for one or more of the irrigation controllers and/or one or more of the irrigation zones associated with the irrigation zones. In some embodiments, the cloud-based irrigation controller may receive irrigation information for irrigation zones associated with two different irrigation controllers. In some embodiments, the cloud-based irrigation controller may receive irrigation information for each of the irrigation zones associated with each of the irrigation controllers tethered to the cloud-based irrigation controller.

In some embodiments, the irrigation information may include any type of irrigation information. For example, the irrigation information may include a location of one or more irrigation devices connected to the plurality of irrigation controllers. In some examples, the irrigation information may include a location of a zone of the irrigation controllers. In some examples, the irrigation information may include a location of the physical irrigation controller device. In some embodiments, the irrigation information may include flow rate information for one or more (or each) of the irrigation zones. In some embodiments, the irrigation information may include hardware specifications for hardware connected to the irrigation controllers. The hardware may include any hardware or devices connected to the irrigation controllers, such as the irrigation controller device, the irrigation devices, the sensors, and other hardware connected to the irrigation controllers. In some embodiments, the specifications of the hardware may include make, model, operating conditions, any other specification, and combinations thereof.

In some embodiments, the cloud-based irrigation controller may further receive, from the irrigation controllers, local irrigation programs for the irrigation zones. The cloud-based irrigation controller may generate a master irrigation program for the irrigation controllers. The master irrigation program may include actuation of multiple zones from multiple different local irrigation controllers.

Figure 7:
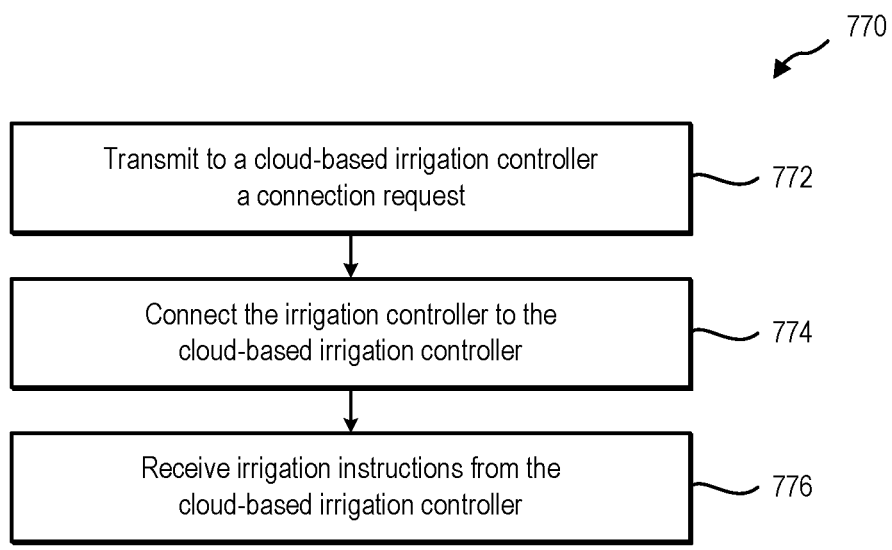
FIG. 7 is a flowchart of a method for irrigation control, according to at least one embodiment of the present disclosure.

As mentioned, FIG. 7 illustrates a flowchart of a method 770 of a series of acts for irrigation control, according to at least one embodiment of the present disclosure. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7. The method 770 illustrated in FIG. 7 may be implemented by the local irrigation controller 502 shown in FIG. 5. Put another way, the local irrigation controller 502 of FIG. 5 may implement the method 770 of FIG. 7.

The local irrigation controller may transmit, to a cloud-based irrigation controller, a connection request at 772. The connection request may include a connection ID of the local irrigation controller. The local irrigation controller may be connected or tethered to the cloud-based irrigation controller at 774. The irrigation controller may receive irrigation instructions from the cloud-based irrigation controller at 776. In some embodiments, the irrigation controller may implement the irrigation instructions. In some embodiments, the irrigation controller may transmit irrigation information to the cloud-based irrigation controller. In some embodiments, the irrigation information may include flow rate information for a plurality of irrigation zones associated with the local irrigation controller.

Figures 1, 8:
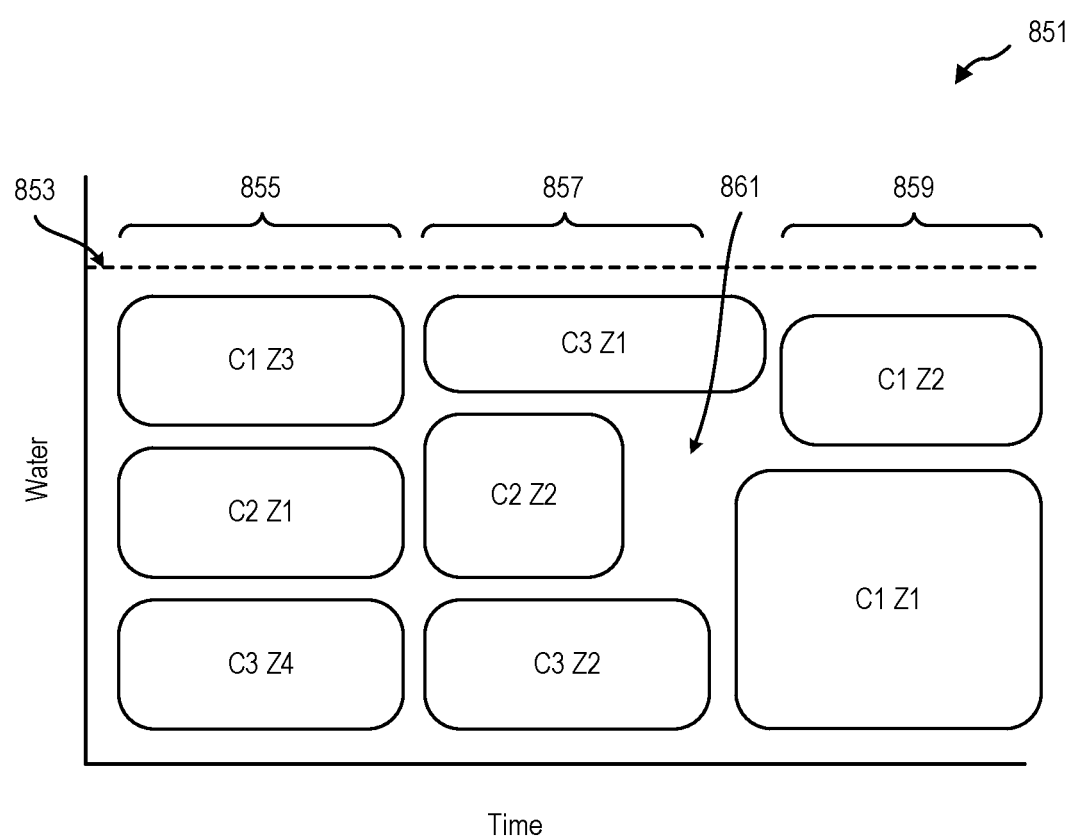
Figures 2, 8:
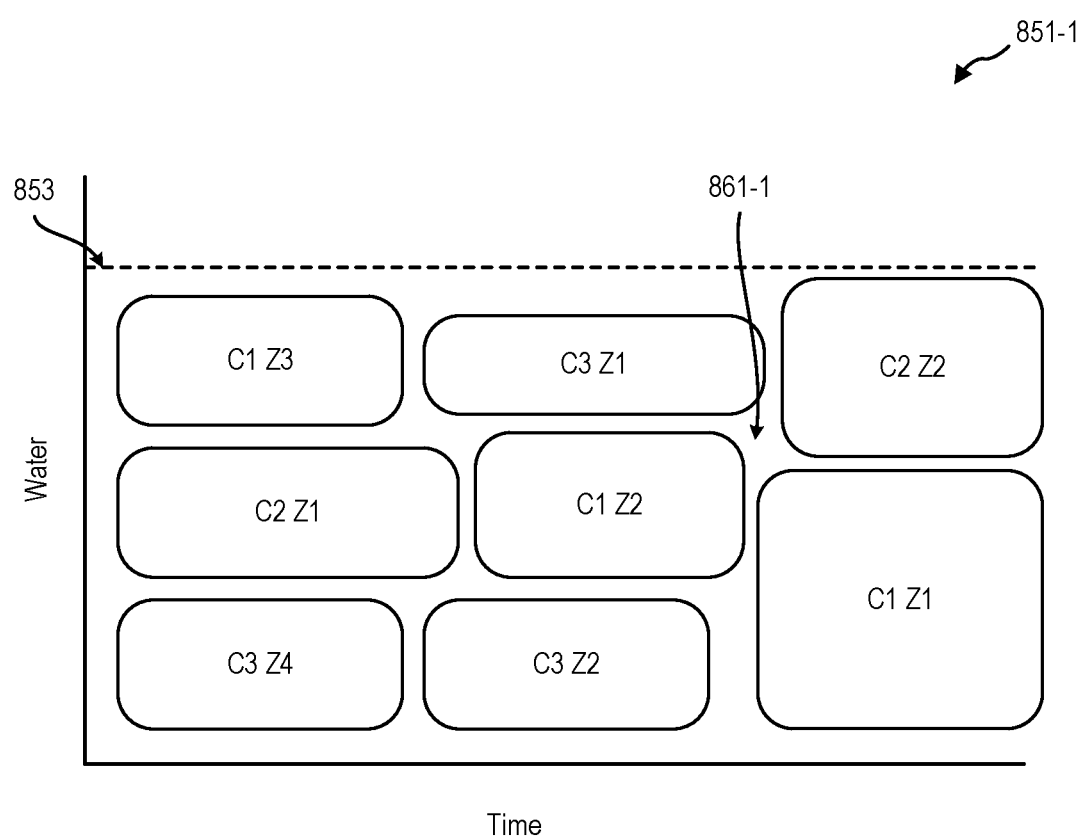

FIG. 8-1 is a representation of a stack plot 851 with time on the x-axis (e.g., horizontal axis) and water consumption on the y-axis (e.g., vertical axis), according to at least one embodiment of the present disclosure. The stack plot 851 includes a water capacity 853. The water capacity 853 may be the total amount of water supply from the water main. Put another way, the water capacity 853 may be the total amount of water available for use by a cloud-based irrigation system.

The stack plot 851 illustrates a stack of a set of irrigation zones. The set of irrigation zones are actuated in a particular order. The set of irrigation zones are graphically illustrated to represent duration and water consumption. For example, the length along the x-axis illustrates the duration of watering, with a longer length correlating to a longer watering period. The height along the y-axis illustrates the water consumption, with a larger height corresponding to a higher water consumption.

As discussed herein, the stack may include a set of irrigation zones from different irrigation controllers. In the embodiment shown, the stack includes 7 total zones from 3 different irrigation controllers. The zones are identified using the prefix C to represent the irrigation controller and the prefix Z to represent the irrigation zone within the associated irrigation controller. Thus, C1 Z3 is representative of irrigation controller 1 zone 3.

In the embodiment shown, during period 855, three zones from three separate irrigation controllers may be simultaneously actuated. For example, C1 Z3, C2 Z1, and C3 Z4 may all be simultaneously actuated. As may be seen, the irrigation zone number may not be representative of which irrigation zone is actuated first. In period 855, each of the irrigation zones have the same start time and the same end time. Put another way, each of the irrigation zones have the same duration. Further, the zones within the period 855 have the same or approximately the same water consumption.

During period 857, irrigation zones C3 Z1, C2 Z2, and C3 Z3 are simultaneously actuated. Each of these zones may start at the same time. As may be seen, each of these zones in period 857 may have different end times. For example, C2 Z2 may have a shorter duration than C3 Z3 and C3 Z1. C3 Z2 may have a shorter duration than C3 Z1. This may result in zone C1 Z1 starting at a different time than zone C1 Z2, which actuate simultaneously during period 859.

As may be seen, the irrigation zones may have different water consumption. For example, zone C2 Z2 may have a greater water consumption than C3 Z2 and C3 Z1. The combination of zones in the period 857 may utilize the water capacity 853 or approximately the water capacity 853. Preparing a stack including multiple zones from different irrigation controllers may result in less waste of the water capacity 853 of the water main.

In some embodiments, through a combination of different watering duration and/or water consumption, the stack may result in unused water capacity 861. Generating the stack including multiple irrigation zones from multiple different irrigation controllers may reduce the size and/or amount of the unused water capacity 861. This may help to reduce the amount of unused water from a water supply and/or during a watering period.

In some embodiments, the stack may incorporate an entirety of the zones from all of the irrigation controllers. In some embodiments, the stack may not incorporate all of the zones from all of the irrigation controllers. For example, one or more irrigation zones may have different watering days, resulting in those zones being excluded from the others stacks.

As discussed herein, a cloud-based irrigation controller may receive irrigation information about the cloud-based irrigation system. For example, the cloud-based irrigation controller may receive updated irrigation information about one or more of the irrigation zones within a watering area. Upon receipt of the updated irrigation information, the cloud-based irrigation controller may prepare revised irrigation instructions for the controllers. This may cause a change in the watering duration, watering consumption, watering constraints, or otherwise change the master watering program of the cloud-based irrigation system.

Changing one or more of the parameters of an irrigation zone may result in a conflict with the stack. For example, in the embodiment shown in FIG. 8-2, the irrigation information resulted in a program change to extend the watering duration of the C2 Z1 zone. This may cause the C2 Z1 zone to overlap with the C2 Z2 zone. This may result in a period of time that the C2 Z1 and C2 Z2 are simultaneously actuated, which may cause the water consumption to exceed the water capacity 853.

In accordance with at least one embodiment of the present disclosure, upon receipt of the updated irrigation information and/or changing of the irrigation program (e.g., changing the C2 Z1 watering duration in the embodiment shown), the cloud-based irrigation controller may generate a new stack plot 851-1. The new stack plot 851-1 may rearrange one or more of the irrigation zones to reduce the unused water capacity 861.

In the embodiment shown, the new stack plot 851-1 shows that the irrigation zones C1 Z2 and C2 Z2 are switched. Put another way, the new stack plot 851-1 may rearrange the remaining irrigation zones. The cloud-based irrigation controller may rearrange the irrigation zones to reduce the amount of unused water capacity 861. In the embodiment shown in FIG. 8-2, the new unused water capacity 861-1 is reduced. However, it should be understood that the new unused water capacity 861-1 may be greater than or equal to the unused water capacity 861.

As discussed herein, the cloud-based irrigation controller may automatically update the stack or prepare a new stack upon receipt of the updated or new irrigation information and/or the changed irrigation program. Put another way, the cloud-based irrigation controller may update the stack or prepare a new stack without input by a human operator. This may help to maintain operation of the cloud-based irrigation system based on changes to the operating conditions.

Figure 9:
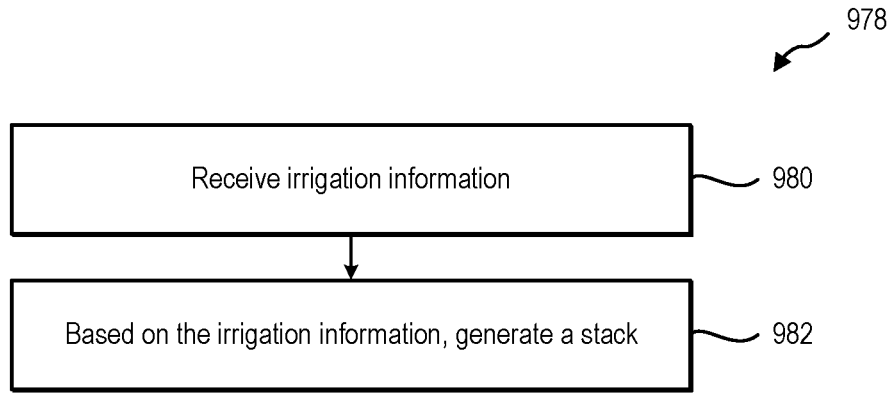
FIG. 9 is a flowchart of a method for irrigation control, according to at least one embodiment of the present disclosure.

As mentioned, FIG. 9 illustrates a flowchart of a method 978 of a series of acts for irrigation control, according to at least one embodiment of the present disclosure. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9. The method 978 illustrated in FIG. 9 may be implemented by the cloud-based irrigation controller 312 shown in FIG. 3. Put another way, the cloud-based irrigation controller 312 of FIG. 3 may implement the method 978 of FIG. 9.

In accordance with at least one embodiment of the present disclosure, the cloud-based irrigation controller may receive irrigation information from one or more local irrigation controllers at 980. In some embodiments, the cloud-based irrigation controller may receive irrigation information for a first plurality of irrigation zones for a first irrigation controller and a second plurality of irrigation zones for a second irrigation controller. Based on the irrigation information, the cloud-based irrigation controller may generate a stack at 982. The stack may include a set of irrigation zones. The set of irrigation zones may include a first irrigation zone from the first plurality of irrigation zones and a second irrigation zone of the second plurality of irrigation zones.

In some embodiments, the first irrigation zone and the second irrigation zone may be actuated simultaneously. In some embodiments, the first irrigation zone and the second irrigation zone may be actuated at different times. In some embodiments, actuation of the first irrigation zone and the second irrigation zone may end at the same time. In some embodiments, actuation of the first irrigation zone and the second irrigation zone may end at the same time.

In some embodiments, the method 978 may include implementing the stack at the first irrigation controller and the second irrigation controller. In some embodiments, the cloud-based irrigation controller may receive updated irrigation information and, based on the updated irrigation information, prepare an updated stack.

In some embodiments, the cloud-based irrigation controller may receive an irrigation program for one or both of the first irrigation controller or the second irrigation controller. The stack may be based on the irrigation program. In some embodiments, the cloud-based irrigation controller may receive an updated irrigation program. For example, the cloud-based irrigation controller may receive the updated irrigation program from an irrigation program manager. In some embodiments, the cloud-based irrigation controller may generate an updated stack based on the updated irrigation program.

In some embodiments, the cloud-based irrigation controller may receive measurements from one or more sensors in communication with the irrigation controllers. The stack may be based at least in part on the measurements. In some embodiments, the stack may be updated based on the measurements.

Figure 10:
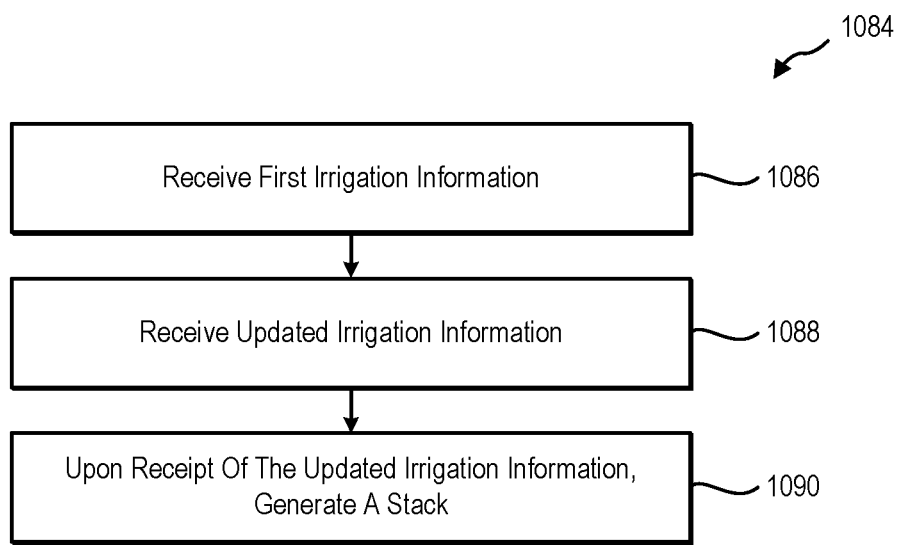
FIG. 10 is a flowchart of a method for irrigation control, according to at least one embodiment of the present disclosure.

As mentioned, FIG. 10 illustrates a flowchart of a method 1084 of a series of acts for irrigation control, according to at least one embodiment of the present disclosure. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10. The method 1084 illustrated in FIG. 10 may be implemented by the cloud-based irrigation controller 312 shown in FIG. 3. Put another way, the cloud-based irrigation controller 312 of FIG. 3 may implement the method 1084 of FIG. 10.

The cloud-based irrigation controller may receive first irrigation information at 1086. The first irrigation may be for a first plurality of irrigation zones for a first irrigation controller and second plurality of irrigation zones for a second irrigation controller. The cloud-based irrigation controller may receive updated irrigation information for the first plurality of irrigation zones and the second plurality of irrigation zones at 1088. Upon receipt of the updated irrigation information, the cloud-based irrigation controller may generate a stack at 1090. The stack may actuate a first irrigation zone from the first plurality of irrigation zones and a second irrigation from the second plurality of irrigation zones simultaneously. In some embodiments, the cloud-based irrigation controller may generate the stack automatically.

In some embodiments, the updated irrigation information may include new irrigation information. For example, the new irrigation information may include irrigation information not previously received or known by the cloud-based irrigation controller.

Figure 11:
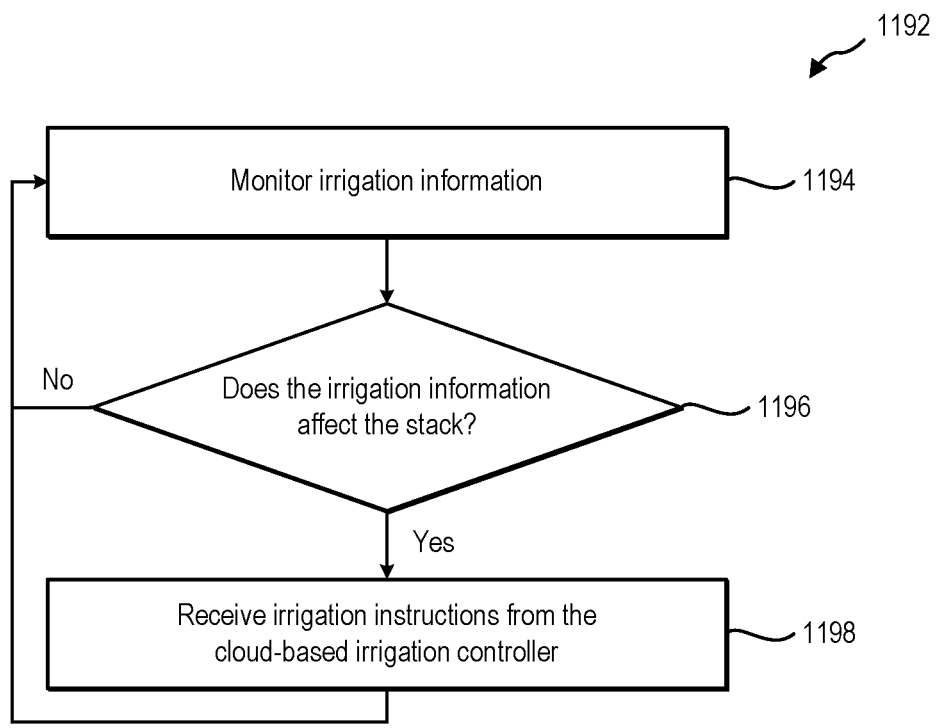
FIG. 11 is a flowchart of a method for irrigation control, according to at least one embodiment of the present disclosure.

As mentioned, FIG. 11 illustrates a flowchart of a method 1192 of a series of acts for irrigation control, according to at least one embodiment of the present disclosure. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11. The method 1192 illustrated in FIG. 11 may be implemented by the cloud-based irrigation controller 312 shown in FIG. 3. Put another way, the cloud-based irrigation controller 312 of FIG. 3 may implement the method 1192 of FIG. 11.

The cloud-based irrigation controller may monitor irrigation information at 1194. For example, the cloud-based irrigation controller may continually receive irrigation information from one or more irrigation controllers. The cloud-based irrigation controller may monitor the irrigation information. The cloud-based irrigation controller may determine 1196 whether the irrigation information affects the stack. For example, the cloud-based irrigation controller may determine whether the irrigation information includes and/or causes a change to the watering amount and/or the watering duration of one or more zones of the stack. If the irrigation information does not affect the stack, then the cloud-based irrigation controller may continue to monitor the irrigation information. If the irrigation does affect the stack, the cloud-based irrigation controller may update the stack based on the updated irrigation information at 1198. The cloud-based irrigation controller may then continue to monitor the irrigation information. In this manner, the cloud-based irrigation controller may continually maintain an updated stack based on the most up-to-date information received from the local irrigation controllers.

Figure 12:
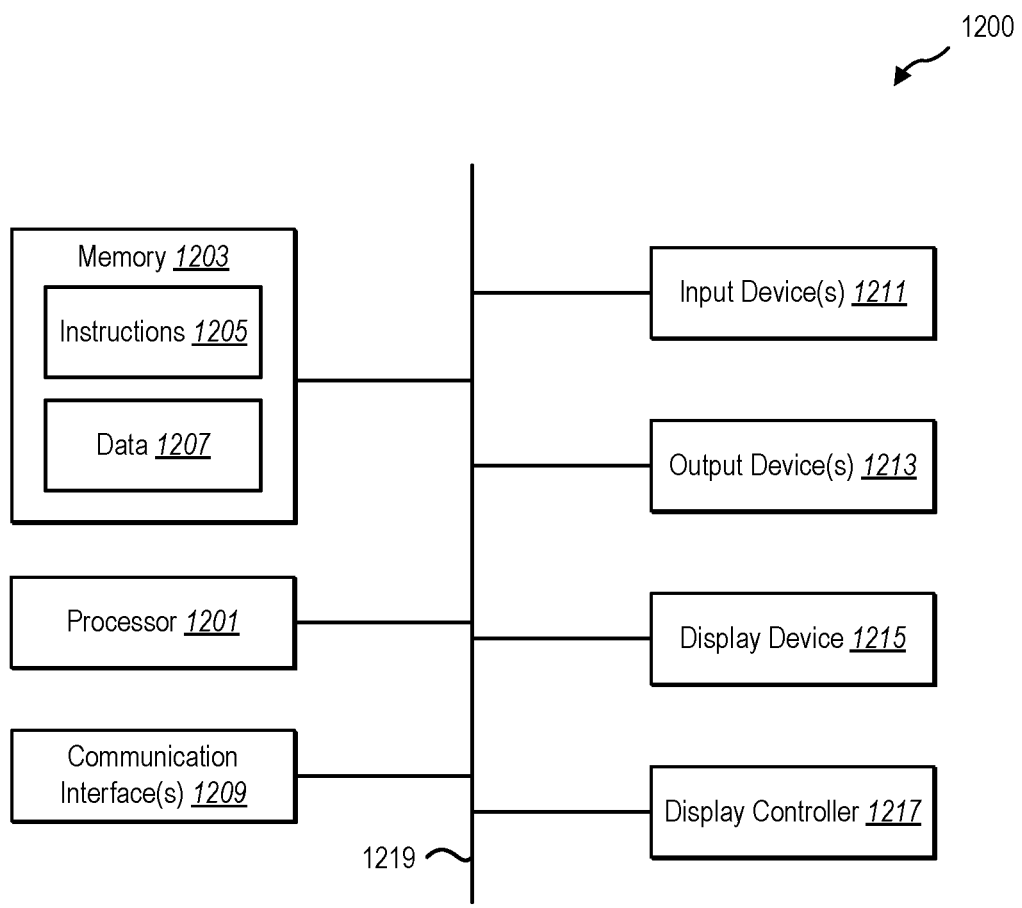
FIG. 12 illustrates certain components that may be included within a computer system 1200.

FIG. 12 illustrates certain components that may be included within a computer system 1200. One or more computer systems 1200 may be used to implement the various devices, components, and systems described herein.

The computer system 1200 includes a processor 1201. The processor 1201 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1201 may be referred to as a central processing unit (CPU). Although just a single processor 1201 is shown in the computer system 1200 of FIG. 12, in an alternative configuration, a combination of processors (e.g., an ARM and DSP) could be used.

The computer system 1200 also includes memory 1203 in electronic communication with the processor 1201. The memory 1203 may be any electronic component capable of storing electronic information. For example, the memory 1203 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1205 and data 1207 may be stored in the memory 1203. The instructions 1205 may be executable by the processor 1201 to implement some or all of the functionality disclosed herein. Executing the instructions 1205 may involve the use of the data 1207 that is stored in the memory 1203. Any of the various examples of modules and components described herein may be implemented, partially or wholly, as instructions 1205 stored in memory 1203 and executed by the processor 1201. Any of the various examples of data described herein may be among the data 1207 that is stored in memory 1203 and used during execution of the instructions 1205 by the processor 1201.

A computer system 1200 may also include one or more communication interfaces 1209 for communicating with other electronic devices. The communication interface(s) 1209 may be based on wired communication technology, wireless communication technology, or both. Some examples of communication interfaces 1209 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 1200 may also include one or more input devices 1211 and one or more output devices 1213. Some examples of input devices 1211 include a keyboard, mouse, microphone, remote control device, button, joystick, trackball, touchpad, and lightpen. Some examples of output devices 1213 include a speaker and a printer. One specific type of output device that is typically included in a computer system 1200 is a display device 1215. Display devices 1215 used with embodiments disclosed herein may utilize any suitable image projection technology, such as liquid crystal display (LCD), light-emitting diode (LED), gas plasma, electroluminescence, or the like. A display controller 1217 may also be provided, for converting data 1207 stored in the memory 1203 into text, graphics, and/or moving images (as appropriate) shown on the display device 1215.

The various components of the computer system 1200 may be coupled together by one or more buses, which may include a power bus, a control signal bus, a status signal bus, a data bus, etc. For the sake of clarity, the various buses are illustrated in FIG. 12 as a bus system 1219.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for irrigation control, comprising:
receiving, at a cloud-based irrigation controller, irrigation information for a first plurality of irrigation zones for a first irrigation controller and a second plurality of irrigation zones for a second irrigation controller, wherein the first plurality of zones include a first plurality of valves connected to a water main and the second plurality of zones include a second plurality of valves connected to the water main, the first plurality of valves controlled by the first irrigation controller and the second plurality of valves controlled by the second irrigation controller;
receiving an irrigation program for one or both of the first irrigation controller or the second irrigation controller;
based at least in part on the irrigation information and the irrigation program, generating a stack, the stack including a set of irrigation zones, the set of irrigation zones including a first irrigation zone of the first plurality of irrigation zones and a second irrigation zone of the second plurality of irrigation zones, the first irrigation zone and the second irrigation zone actuated simultaneously;

receiving, at the cloud-based irrigation controller, updated irrigation information about one or more of the irrigation zones of the first or second plurality of irrigation zones;

determining that the updated irrigation information includes or causes a change to a watering amount or duration of one or more irrigation zones of the first stack; and based on the change to the watering amount or the duration, generating a second stack in which one or more of the irrigation zones are rearranged.

2. The method of claim 1, further comprising implementing the stack at the first irrigation controller and the second irrigation controller.

3. The method of claim 1, wherein the stack includes actuation of the first irrigation zone and the second irrigation zone at different times.

4. The method of claim 1, further comprising receiving an updated irrigation program and wherein generating the second stack includes generating the second stack based on the updated irrigation program.

5. The method of claim 1, further comprising receiving measurements from one or more sensors in communication with one or both of the first irrigation controller or the second irrigation controller, the stack being based at least in part on the measurements.

6. The method of claim 1, wherein, in the second stack, the first irrigation zone and the second irrigation zone are not actuated simultaneously.

7. The method of claim 1, wherein the updated irrigation information causes a water consumption of the first stack to exceed a water capacity of the water main, and wherein generating the second stack rearranges the first plurality of zones and/or the second plurality of zones to be within the water capacity.

8. The method of claim 1, wherein the updated irrigation information causes a water consumption of the first stack to increase an unused water supply of a water capacity of the water main, and wherein generating the second stack rearranges the first plurality of zones and/or the second plurality of zones to reduce the unused water capacity.

9. The method of claim 1, wherein generating the second stack includes changing a watering duration for at least one of the first plurality of irrigation zones or the second plurality of irrigation zones.

10. The method of claim 1, wherein a first unused water capacity of the first stack is less than a second unused water capacity of the second stack.

11. The method of claim 1, wherein generating the second stack rearranges all of the first plurality of irrigation zones and the second plurality of irrigation zones.

12. The method of claim 1, wherein generating the second stack includes generating the second stack without input by a human operator.

13. The method of claim 1, wherein determining that the irrigation includes or causes a change to a watering amount or duration includes determining that at least two zones of the first plurality of irrigation zones or the second plurality of irrigation zones overlap.

14. A cloud-based irrigation system, comprising:
a cloud-based irrigation controller configured to:
receive irrigation information for a first plurality of irrigation zones for a first irrigation controller and a second plurality of irrigation zones for a second irrigation controller, wherein the first plurality of irrigation zones include a first plurality of valves connected to a water main and the second plurality of irrigation zones include a second plurality of valves connected to the water main, the first plurality of valves controlled by the first irrigation controller and the second plurality of valves controlled by the second irrigation controller;

receive an irrigation program for one or both of the first irrigation controller or the second irrigation controller; and based at least in part on the irrigation information and the irrigation program, generate a stack, the stack including a set of irrigation zones, the set of irrigation zones including a first irrigation zone of the first plurality of irrigation zones and a second irrigation zone of the second plurality of irrigation zones, the first irrigation zone and the second irrigation zone actuated simultaneously;

receive, at the cloud-based irrigation controller, updated irrigation information about one or more of the irrigation zones of the first or second plurality of irrigation zones;

determine that the updated irrigation information includes or causes a change to a watering amount or duration of one or more irrigation zones of the first stack; and based on the change to the watering amount or the duration, generate a second stack in which one or more of the irrigation zones are rearranged.

15. The cloud-based irrigation system of claim 14, wherein the cloud-based irrigation controller is further configured to implement the stack at the first irrigation controller and the second irrigation controller.

16. The cloud-based irrigation system of claim 14, wherein the stack includes actuation of the first irrigation zone and the second irrigation zone at different times.

17. The cloud-based irrigation system of claim 14, wherein the cloud-based irrigation controller is further configured to receiving-receive an updated irrigation program and wherein generating the second stack includes generating the second stack based on the updated irrigation program.

18. The cloud-based irrigation system of claim 14, wherein the cloud-based irrigation controller is further configured to receive measurements from one or more sensors in communication with one or both of the first irrigation controller or the second irrigation controller, the stack being based at least in part on the measurements.

19. A method for irrigation control, comprising:
receiving, at a cloud-based irrigation controller, irrigation information for a first plurality of irrigation zones for a first irrigation controller and a second plurality of irrigation zones for a second irrigation controller, wherein the first plurality of zones include a first plurality of valves connected to a water main and the second plurality of zones include a second plurality of valves connected to the water main, the first plurality of valves controlled by the first irrigation controller and the second plurality of valves controlled by the second irrigation controller;

based on the irrigation information, generating a first stack, the first stack including a set of irrigation zones, the set of irrigation zones including a first irrigation zone of the first plurality of irrigation zones and a second irrigation zone of the second plurality of irrigation zones, the first irrigation zone and the second irrigation zone actuated simultaneously;

receiving, at the cloud-based irrigation controller, updated irrigation information about one or more of the irrigation zones of the first or second plurality of irrigation zones;

determining that the updated irrigation information includes or causes a change to a watering amount or duration of one or more irrigation zones of the first stack that indicates unused water capacity that is higher than unused water capacity before the change; and based on the determining, generating a second stack in which one or more of the irrigation zones are rearranged to reduce unused water capacity with respect to the unused water capacity after the change.

20. The method of claim 19, further comprising implementing the second stack at the first irrigation controller and the second irrigation controller.

\* \* \* \* \*

UNITED STATES PATENT AND TRADEMARK OFFICE
CERTIFICATE OF CORRECTION

| | |
|---|---|
| PATENT NO. | : 12,295,298 B2 |
| APPLICATION NO. | : 18/072370 |
| DATED | : May 13, 2025 |
| INVENTOR(S) | : Rudy Lars Larsen |

It is certified that error appears in the above-identified patent and that said Letters Patent is hereby corrected as shown below:

On the Title Page

Please change the Assignee from "SMART RAIN SYSTEMS, LCC" to --SMART RAIN SYSTEMS, LLC--.

Signed and Sealed this
Twenty-fourth Day of June, 2025

Coke Morgan Stewart
*Acting Director of the United States Patent and Trademark Office*